US012600580B2

(12) United States Patent
Unkovic et al.

(10) Patent No.: US 12,600,580 B2
(45) Date of Patent: Apr. 14, 2026

(54) ROBOTIC END EFFECTOR SYSTEM FOR MULTIPLE DEPOSITS

(71) Applicant: Chef Robotics, Inc., San Francisco, CA (US)

(72) Inventors: John Unkovic, San Francisco, CA (US); Somudro Gupta, San Francisco, CA (US); Rajat Bhageria, San Francisco, CA (US); Luis Rayas, San Francisco, CA (US); Kody Brown, San Francisco, CA (US); Xinyi Daniel Tang, San Francisco, CA (US); Weston Wahl, San Francisco, CA (US); Clement Creusot, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 0 days.

(21) Appl. No.: 19/186,481

(22) Filed: Apr. 22, 2025

(65) Prior Publication Data

US 2025/0326591 A1     Oct. 23, 2025

Related U.S. Application Data

(60) Provisional application No. 63/637,245, filed on Apr. 22, 2024.

(51) Int. Cl.
*B65G 47/90* (2006.01)
*B25J 9/00* (2006.01)
(Continued)

(52) U.S. Cl.
CPC .......... *B65G 47/907* (2013.01); *B25J 9/0093* (2013.01); *B25J 9/1664* (2013.01);
(Continued)

(58) Field of Classification Search
CPC .. B65G 47/905; B65G 47/907; B65G 47/918; B65G 2201/0202–0211; B25J 9/1664;
(Continued)

(56) References Cited

U.S. PATENT DOCUMENTS

D547,643 S      7/2007  Ratajczek et al.
D553,655 S     10/2007  Jennings et al.
(Continued)

FOREIGN PATENT DOCUMENTS

JP       H1190871 A      4/1999
KR      102599468 B1    11/2023
WO     2023231735 A1    12/2023

OTHER PUBLICATIONS

"Chef Robotics Fully Automated Line Youtube", posted Jul. 11, 2024 [online], [retrieved Oct. 11, 2024]. Retrieved from internet, https://youtube.com/watch?v=S9r-vHW_xng (Year: 2024).
(Continued)

*Primary Examiner* — Spencer D Patton
(74) *Attorney, Agent, or Firm* — Jeffrey Schox; Evan Myers

(57)     ABSTRACT

The multi-deposit end effector system 100 can include: a set of actuators 110; an optional set of utensil mating connectors 120; and a plurality of utensils 200. Each utensil can include: a set of scoops 210; a set of mechanical linkages 220; a set of ingressive elements 230; and/or any other suitable components. However, system 100 can additionally or alternatively include any other suitable set of components. The system functions to facilitate ingredient (e.g., foodstuffs) manipulation with the plurality of utensils. More preferably, the system can function to facilitate portioned ingredient picking and/or deposition (e.g., insertion at a target foodstuff container and/or placement location) using each utensil of the plurality of utensils.

17 Claims, 22 Drawing Sheets

(51) Int. Cl.
  *B25J 9/16* (2006.01)
  *B25J 11/00* (2006.01)
  *B25J 15/00* (2006.01)
(52) U.S. Cl.
  CPC ....... *B25J 11/0045* (2013.01); *B25J 15/0052*
    (2013.01); *B65G 47/905* (2013.01); *B65G*
    *2201/0202* (2013.01)
(58) Field of Classification Search
  CPC ...... B25J 9/1669; B25J 9/1679; B25J 9/1697;
    B25J 11/0045; B25J 15/0052–0066; B25J
    9/0093
  See application file for complete search history.

(56) References Cited

U.S. PATENT DOCUMENTS

| | | | |
|---|---|---|---|
| D651,626 S | 1/2012 | Koike et al. | |
| D785,688 S | 5/2017 | Matsuda | |
| D876,191 S | 2/2020 | Orikawa | |
| D900,182 S | 10/2020 | Haddadin et al. | |
| D924,295 S | 7/2021 | Son et al. | |
| D958,859 S | 7/2022 | Picard et al. | |
| D985,692 S | 5/2023 | Clemmer | |
| 2011/0166703 A1 | 7/2011 | Byrne | |
| 2012/0043777 A1* | 2/2012 | Maffeis | B25J 15/0253 |
| | | | 294/195 |
| 2017/0290345 A1 | 10/2017 | Garden et al. | |
| 2018/0257219 A1 | 9/2018 | Oleynik | |
| 2019/0291277 A1 | 9/2019 | Oleynik | |
| 2020/0054175 A1* | 2/2020 | Roy | B25J 21/00 |
| 2020/0082522 A1 | 3/2020 | Bonneau et al. | |
| 2020/0086485 A1 | 3/2020 | Johnson et al. | |
| 2020/0090099 A1 | 3/2020 | Johnson et al. | |
| 2020/0101617 A1* | 4/2020 | Koike | B25J 9/1697 |
| 2020/0394603 A1 | 12/2020 | Ottitsch et al. | |
| 2021/0299706 A1 | 9/2021 | Filler et al. | |
| 2021/0400993 A1* | 12/2021 | Hare | B65B 25/06 |
| 2022/0033123 A1 | 2/2022 | Zheng | |
| 2022/0048707 A1 | 2/2022 | Matl et al. | |
| 2022/0227005 A1 | 7/2022 | Sakai et al. | |
| 2022/0331974 A1 | 10/2022 | Lovedale et al. | |
| 2022/0346598 A1 | 11/2022 | Sinnet et al. | |
| 2022/0348409 A1 | 11/2022 | Sun et al. | |
| 2023/0039524 A1 | 2/2023 | Bhageria et al. | |
| 2023/0123516 A1 | 4/2023 | Brown et al. | |
| 2023/0159285 A1 | 5/2023 | Catelli et al. | |
| 2023/0191615 A1 | 6/2023 | Creusot et al. | |
| 2023/0303342 A1 | 9/2023 | Kulkarni et al. | |
| 2023/0347525 A1 | 11/2023 | Bhageria et al. | |
| 2023/0390941 A1 | 12/2023 | Opoku et al. | |
| 2024/0198540 A1 | 6/2024 | Huang | |

OTHER PUBLICATIONS

"Chef Robotics Homepage", posted date unknown [online], [retrieved Oct. 11, 2024]. Retrieved from internet, https://www.chefrobotics.ai/.

"Chef Robotics Marinara Sauce", posted Jul. 11, 2024 [online], [retrieved Oct. 11, 2024]. Retrieved from internet, https://www.youtube.com/watch?v=rmt6UcVyxfM (Year: 2024).

"EMI Engineers are here to assist you with all aspects of your part handling EOAT", EMI, EOAT Solutions, EOAT Engineering, https://www.emicorp.com/eoat-engineering, first downloaded Jan. 23, 2025.

"End Effector Animation", posted Jul. 11, 2024 [online], [retrieved Oct. 11, 2024]. Retrieved from internet, https://www.youtube.com/watch?v=Ox_tJj7IT8E&list=PLQRM4UQvc8BU-XerAanKp3-ffORJpGInV&index=4 (Year: 2024).

* cited by examiner utensil 200 actuation input 112 mechanical linkage 220 ingressive element
230 linkage pivot
220

Ingressive element
transformation scoop
transformation grasp cavity
202 scoop 210

Electric actuator

Cam plate

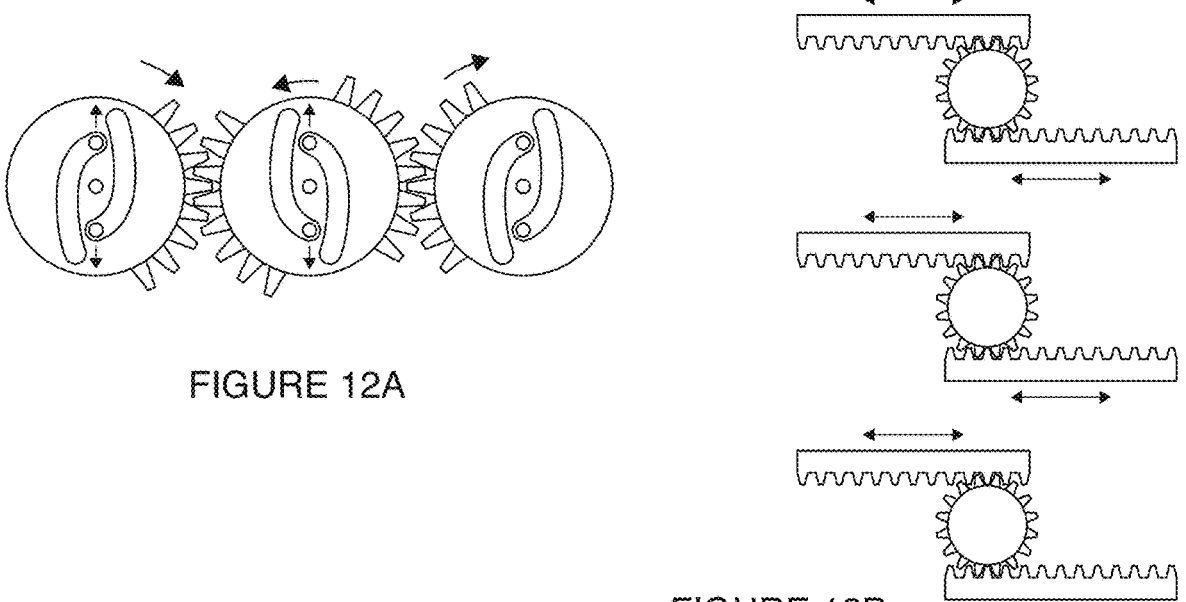
FIGURE 12A
FIGURE 12B
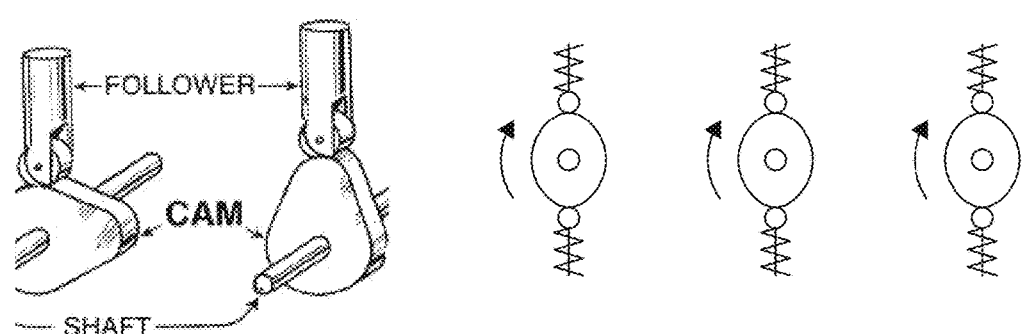
FIGURE 12C

ROBOTIC END EFFECTOR SYSTEM FOR MULTIPLE DEPOSITS

CROSS REFERENCE TO RELATED APPLICATIONS

This application claims the benefit of U.S. Provisional Application No. 63/637,245, filed 22 Apr. 2024 which is incorporated herein in its entirety by this reference.

This application is related to U.S. application Ser. No. 17/965,202, filed 13 Oct. 2022, which claims the benefit of U.S. Provisional Application Ser. No. 63/337,497, filed 2 May 2022, U.S. Provisional Application Ser. No. 63/304, 449, filed 28 Jan. 2022, U.S. Provisional Application Ser. No. 63/255,875, filed 14 Oct. 2021, and U.S. Provisional Application Ser. No. 63/255,869, filed 14 Oct. 2021, each of which is incorporated herein in its entirety by this reference.

U.S. Design application Ser. No. 29/855,432, filed 3 Oct. 2022, is incorporated herein in its entirety by this reference.

U.S. Design application Ser. No. 29/873,689, filed 5 Apr. 2023, is incorporated herein in its entirety by this reference.

TECHNICAL FIELD

This invention relates generally to the food industry field, and more specifically to a new and useful multi-deposit robotic end effector system in the food industry field.

BACKGROUND

Robotic multi-grippers have been developed to pick multiple object instances simultaneously with a single robot. Conventional implementations are typically limited to instance-based picking, such as where object instances are individually grasped/picked by an independent operation of a respective gripper (i.e., two independent motions of a robot used to pick two object instances with respective grippers) and/or multi-instance picking in a tightly-controlled automation environment (i.e., where the separation/relationship between objects is tightly controlled and where the insertion environment is tightly controlled based on the known separation between object instances). Additionally, multi-function grippers have been developed which are capable of performing multiple, independent tasks, typically for a single object instance, by using multiple actuators on a single robot. Since these existing systems are typically designed to operate on individual object instances and are tied to automation requirements driven by the constraints of instance-based operation, these systems are not well suited to 'bulk' picking (e.g., 'volumetric' picking) of multiple portions and are not well suited to collaborative environments (e.g., where the environmental factors and constraints may not be tightly controlled). Additionally, existing multi-grippers are not typically designed to pick foodstuffs (e.g., particularly viscoelastic, sticky foodstuffs) or operate in a food industry setting. Thus, there is a need in the food industry field for a multi-deposit robotic end effector.

BRIEF DESCRIPTION OF THE FIGURES

FIGS. 12A-12C include examples of transmission mechanisms in one or more variants of the system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
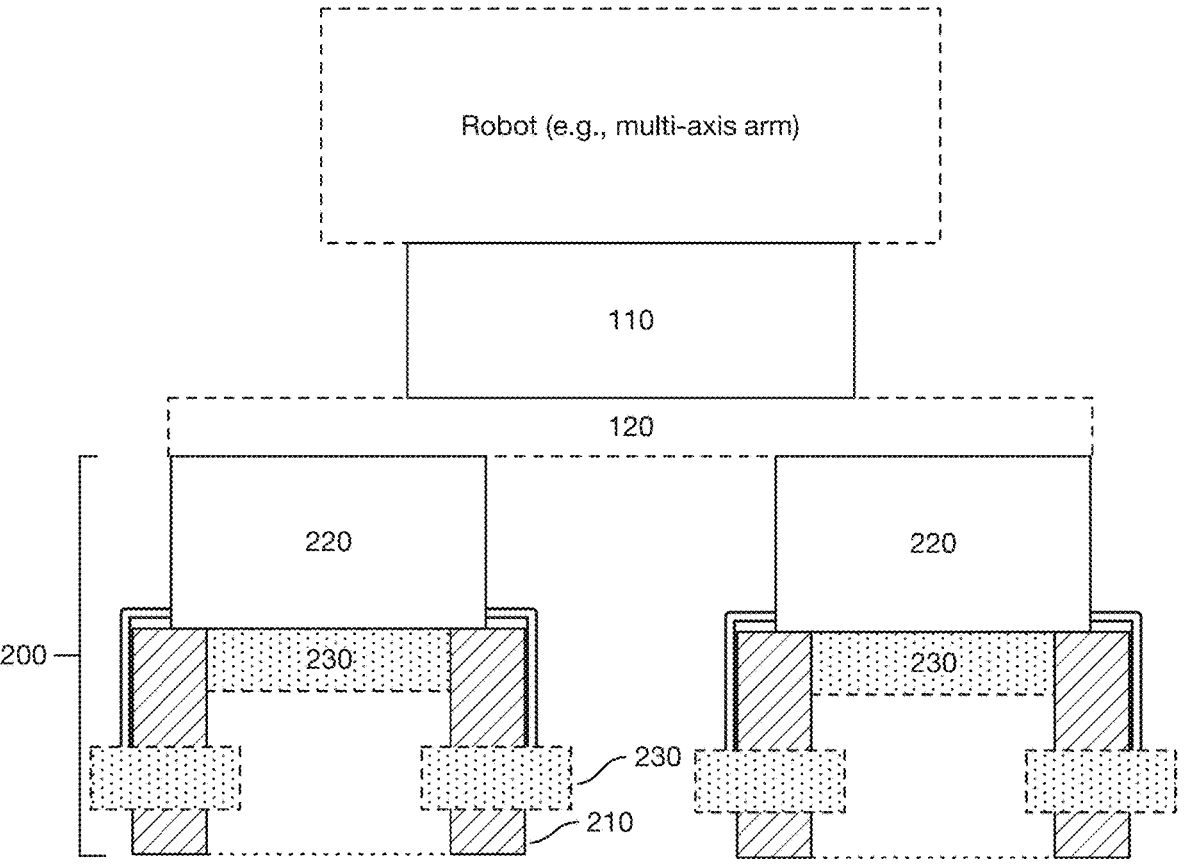
FIG. 1 is a schematic representation of a variant of the multi-deposit end effector system.

The multi-deposit end effector system 100, an example of which is shown in FIG. 1, can include: a set of actuators 110; an optional set of utensil mating connectors 120; and a plurality of utensils 200. Each utensil can include: a set of scoops 210; a set of mechanical linkages 220; a set of ingressive elements 230; and/or any other suitable components. However, system 100 can additionally or alternatively include any other suitable set of components. The system functions to facilitate ingredient (e.g., foodstuffs) manipulation with the plurality of utensils. More preferably, the system can function to facilitate portioned ingredient picking and/or deposition (e.g., insertion at a target foodstuff container and/or placement location) using each utensil of the plurality of utensils. Most preferably, the system functions to facilitate multiple ingredient depositions (e.g., with respective utensils) between successive picks and/or synchronous grasping of portioned ingredients by each of the plurality of foodstuff utensils (i.e., simultaneous transport of portioned foodstuffs with each foodstuff utensil).

Additionally or alternatively, the end effector system and/or each utensil thereof can function to facilitate ingredient (e.g., foodstuffs) manipulation, ingredient picking, ingredient transformation, and/or ingredient insertion (e.g., at a target foodstuff container and/or placement location) via a grasp cavity of the utensil. Additionally or alternatively, the end effector system can function to shape a profile of ingredients (e.g., upon insertion), evacuate ingredients from the grasp cavity (e.g., clearing out ingredients adhering to the utensil), and/or perform any other suitable function(s).

The system 100 can optionally include or be used in conjunction with a robotic assembly system, such as a robotic pick and place system, gantry-style assembly system, multi-axis robotic arm, and/or other robotic assembly system. In variants, the system can be used in conjunction with the robotic assembly system and/or method as described in U.S. application Ser. No. 17/881,475, filed 4 Aug. 2022, which is incorporated herein in its entirety by this reference.

The system 100 is preferably configured to mount to a distal end of a robotic assembly system, such as a robotic pick and place system, gantry-style assembly system, multi-axis robotic arm, and/or other robotic assembly system. In variants, the system can be used in conjunction with the robotic assembly system and/or method as described in U.S. application Ser. No. 17/881,475, filed 4 Aug. 2022, which is incorporated herein in its entirety by this reference. In an example, the end effector and/or actuator are configured to mount to a distal end of a robotic arm (e.g., multi-axis robotic arm; collaborative robotic arm; etc.). However, the end effector system 100 can be configured to operate with any other suitable robotic system and/or in any other suitable robotic assembly context.

In variants, the system 100 and/or the component(s) thereof (e.g., utensil; individual actuators; etc.) can be configured to be individually or collectively certified in compliance with various food industry standards (e.g., NSF food safety standards; food safe), and/or may otherwise be considered 'food safe'. For example, variants can include or be utilized in conjunction with NSF H1 food safe grease (e.g., at each revolute joint) and/or food safe epoxy (e.g., to seal/cover an external opening/cavity, etc.). Additionally or alternatively, variants may be utilized outside of food applications and/or in various alternative contexts without food safety requirements/standards; and/or may be otherwise configured.

In variants, the system and/or each component thereof (e.g., utensil) can be configured to be individually or collectively certified in compliance with various ingress protection standards (e.g., IP65; IP67; IP67+; etc.). However, variants may be utilized outside of industrial applications and/or in various alternative contexts without certified compliance with ingress protection requirements/standards; and/or may be otherwise configured.

The system 100 can optionally include or be used in conjunction with an industrial conveyor line, or can be deployed in a high-throughput assembly application (e.g., airline food catering prep, etc.), such as in place of a human line worker and a manually-operated utensil. However, the system can additionally or alternatively be deployed in any suitable robotic assembly settings. In variants, the multi-deposit end effector system can be implemented in a restaurant setting, such as a 'fast casual', 'ghost kitchen' or low-throughput application (e.g., without continuous operation; universities, K-12, prisons, hotels, hospitals, factories, stadiums, entertainment venues, festivals, etc.), such as to facilitate manipulation of multiple types of ingredients using separate utensils.

The term "substantially" as utilized herein can mean: exactly, approximately, within a predetermined threshold or tolerance, and/or have any other suitable meaning.

The term "color distance" as utilized herein can refer to the color distance D which is calculated in terms of RGB values by the equation $D^2=R^2+G^2+B^2$ or, similarly, $D=\sqrt{R^2+G^2+B^2}$, where R, G, and B respectively refer to the differences in red, green, and blue values of two colors. For example, the color distance between a first color with RGB values R1, G2, and B1 and a second color with RGB values R2, G2, and B2, the color distance between the first and second colors can be calculated as: $D=\sqrt{(R2-R1)^2+(G2-G1)^2+(B2-B1)^2}$. However, the color distance can be otherwise calculated and/or defined. Likewise, a "minimum color distance" can be understood to mean a minimum value for the color distance/separation between two colors or color ranges. However, the minimum color distance can be otherwise defined.

The term "bulk" as utilized herein, in reference to bulk material, bulk ingredients, bulk foodstuff, bulk portions, or otherwise, preferably refers to a non-instance-based aggregate amount. Additionally or alternatively, bulk may be interchangeably used or referenced as loose (e.g., not individually packaged), extensive (e.g., aggregate amount including multiple, uncounted instances), uncounted, and/or can be otherwise suitably used/referenced. For example, bulk portions of ingredients preferably refer to ingredient portions whose properties may be unitarily evaluated in the aggregate (e.g., aggregate mass, unitary weight, volume, etc.). Additionally or alternatively, bulk portions can comprise multiple (uncounted) ingredient instances (e.g., grains of rice) and/or multiple types of ingredients in mixture (e.g., homogenous, heterogenous, etc.), and/or can be otherwise suitably used/referenced herein. For instance, a target bulk portion (e.g., 100 g portion, 50 mL portion, 100 calorie portion, etc.) of a mixture of rice and chopped carrots may (exactly) satisfy the target portion (or target portion range) with an arbitrary, uncounted number of rice grains and carrot chunks. However, the term bulk can be otherwise suitably used/referenced herein.

The term "bowl" as utilized herein can additionally or alternatively refer to containers (e.g., food container), trays (e.g., food trays, microwave trays, etc.), base food items (e.g., tortilla, bread, dough, etc.; such as for burritos, wraps, sandwiches, pizzas, etc.), fruit cups, party trays, bins, and/or any other suitable bowls or other object(s), such as objects in a (conveyor) line assembly context. For instance, the terms "bowl detector" (and/or "bowl detection model") can likewise reference a container detector, container detection model, and/or any other suitable object detection model(s). Similarly, the term "bowl classifier" (and/or "bowl classification model") can likewise reference a container classifier, container classification model, and/or any other suitable object classification model(s). However, the term "bowl" can be otherwise suitably referenced herein. Additionally, it is understood that, in some variants, bowl detection/classification approaches herein may be generalized to any other suitable object detection problems and/or assembly contexts. For instance, variants can additionally or alternatively be used for detection and classification of the self-contained foods (i.e., food-based containers/bowls), such as breadbowls, wraps, burritos, pizzas, and/or any other suitable self-contained food assemblies, and/or in any other suitable food-based or other detection contexts.

2. Benefits

Variations of the technology can afford several benefits and/or advantages.

First, variations of this technology can be utilized in a robotic assembly architecture to facilitate multiple deposit operations between successive pick cycles of an end effector, which can increase the net throughput. For example, variants may reduce the fraction of cycle time associated with robot traversal between a foodstuff bin and a conveyor line, thereby increasing the overall throughput. Additionally, variants may increase the number of portions deposited during a single pick-and-place cycle of operation.

Second, variations of this technology can facilitate portioned deposition of bulk material, such as bulk foodstuffs. For example, variants can facilitate volumetric picking and insertion of bulk foodstuffs (e.g., rice, chopped carrots, etc.). Additionally, variations of this technology can facilitate placement of sticky (e.g., viscoelastic), malleable, and/or partially frozen foodstuffs-which may otherwise tend to cause ingredient buildup on end-effector surfaces after multiple placement cycles. Variations of this technology can limit ingredient buildup and facilitate continuous operation (e.g., without manual servicing, tool replacement, cleaning, etc.) even after many cycles (e.g., 10, 100, 1 k, 10 k, 20 k, 30 k, 50 k, 100 k, more than 100 k, any range bounded by the aforementioned values, etc.).

Third, variations of this technology can facilitate operation in a collaborative environment and/or with a collaborative robot arm. For example, variations of the technology can facilitate operation on a conveyor line (such as a non-indexed conveyor line) alongside humans, where the relative arrangement of bowls may be uncontrolled (e.g., human influence may impact bowl spacing, orientation, lateral position, etc.). Variants can utilize perception and/or interchangeable utensils to facilitate high accuracy (e.g., mass/volume/quantity within a threshold tolerance, such as within 10% of a predetermined amount) and repeatability (e.g., minimal variability across different robotic arms, particularly when compared to different human users) of portioned food amounts in a collaborative setting. Additionally, variations of the technology can operate within the weight and/or kinematic motion constraints of a collaborative robot arm (e.g., established by ISO standards), while facilitating multi-deposit operation. Additionally, variations of this technology can facilitate insertion into containers with different (or inconsistent) orientation and/or spacing along a conveyor line, and/or otherwise facilitate operation in collaborative (and/or not tightly controlled) assembly line environment.

Fourth, variations of the technology can enable detection and tracking of one or more insertion targets (e.g., containers) in a high-throughput setting, wherein the insertion operation may necessarily occlude perception data. In particular, picking and/or operation of the utensils above the foodstuff bin (e.g., within the bounds of the frame) may provide a sufficient time window for observation of the conveyor line and tracking of one or more (unfilled) container targets, in absence of robot arm occlusion. In particular, the multi-deposit operation (e.g., synchronous and/or asynchronous) can include trajectory planning and insertion into multiple tracked containers while both are partially or fully occluded by the robot arm, which may avoid the additional time to perceive, track, and plan insertion trajectories for containers which are already captured within the perception data, thus increasing the relative cycle time compared to single-pick/single-insert operation. Conversely, where only a single container target is present along the conveyor upon multi-picking, upon insertion the arm may not be required to perform an additional pick and instead may hold in a position (e.g., above the foodstuff bin, within the bounds of the frame, etc.) which does not occlude perception of the conveyor line and allows the system to respond upon detection of another insert target (i.e., without a pick delay). However, the system can be otherwise configured.

Fifth, variants of the technology can facilitate high-throughput operation in conjunction with predetermined and/or pre-dimensioned arrays of containers along a conveyor line. For example, variants can allow operation in conjunction with multi-lane conveyors (e.g., placing in containers offset along the width of the conveyor), indexed conveyors (e.g., where the spacing between containers in the direction of traversal is fixed), and/or any other suitable conveyor settings.

Additionally, variations of this technology can provide and/or increase the benefits as described in U.S. application Ser. No. 17/965,202, filed 13 Oct. 2022, titled "ROBOTIC END EFFECTOR SYSTEM AND/OR METHOD," by facilitating multi-deposit (and/or multi-pick) operation of the end effector system.

However, variations of the technology can additionally or alternately provide any other suitable benefits and/or advantages.

3. Multi-Deposit End Effector System

The multi-deposit end effector system 100, an example of which is shown in FIG. 1, can include: a set actuators 110; an optional set of utensil mating connectors 120; and a plurality of utensils 200. Each utensil can include: a set of scoops 210; a set of mechanical linkages 220; a set of ingressive elements 230; and/or any other suitable components. However, system 100 can additionally or alternatively include any other suitable set of components. The system functions to facilitate ingredient (e.g., foodstuffs) manipulation with the plurality of utensils. More preferably, the system can function to facilitate portioned ingredient picking and/or deposition (e.g., insertion at a target foodstuff container and/or placement location) using each utensil of the plurality of utensils. Most preferably, the system functions to facilitate multiple ingredient depositions (e.g., with respective utensils) between successive picks and/or synchronous grasping of portioned ingredients by each of the plurality of foodstuff utensils (i.e., simultaneous transport of portioned foodstuffs with each foodstuff utensil). However, the system 100 can provide any other suitable functionality.

3.1 Actuator(s)

The set of actuators 110 function to provide an actuation input to the utensil(s) and/or the set(s) of mechanical linkages thereof to transform the respective scoops (and/or foodstuff ingredients housed therein). Each actuator is preferably mounted to the terminal end of a robotic assembly system (e.g., wrist of a multi-axis robot arm; final stage of a gantry system; etc.) and/or integrated into a robotic assembly system, but can be otherwise implemented.

The system can include a single actuator (e.g., exactly one actuator and/or actuator output; mounted at the distal end of a robot arm), multiple actuators (e.g., 2, 3 more than 3, etc.; one actuator per utensil, multiple actuators per utensil, etc.), and/or any other suitable number of actuator(s).

The actuator(s) can be powered: electrically (e.g., servo or motor actuation), pneumatically, hydraulically, mechanically (e.g., Bowden cable, such as may be used to transmit a mechanical force from a separate actuator at a base end or proximal portion of the robotic arm), and/or otherwise suitably powered. The actuation input provided by the actuator can be linear, rotational, or a combination thereof.

The actuator can act in a single direction (e.g., with an opposing spring-loaded return; single acting) or bi-directionally (e.g., powered in both directions along an actuation axis; double acting). The actuator can have a single actuation end (e.g., with an opposing end fixedly mounted; single stroke) or two actuation ends (e.g., actuating in opposite directions and centrally mounted between the actuation ends). As an example, the actuator can be a linear actuator (e.g., providing a linear actuation stroke as an actuation input). As a second example, the actuator can be an electric motor (e.g., providing a rotational actuation as an input and/or a combined rotation/translation as an actuation input). In variants, the end effector can be a rotary end effector, an angular end effector, and/or any other suitable end effector with any other suitable actuation degrees of freedom.

Figure 3A:
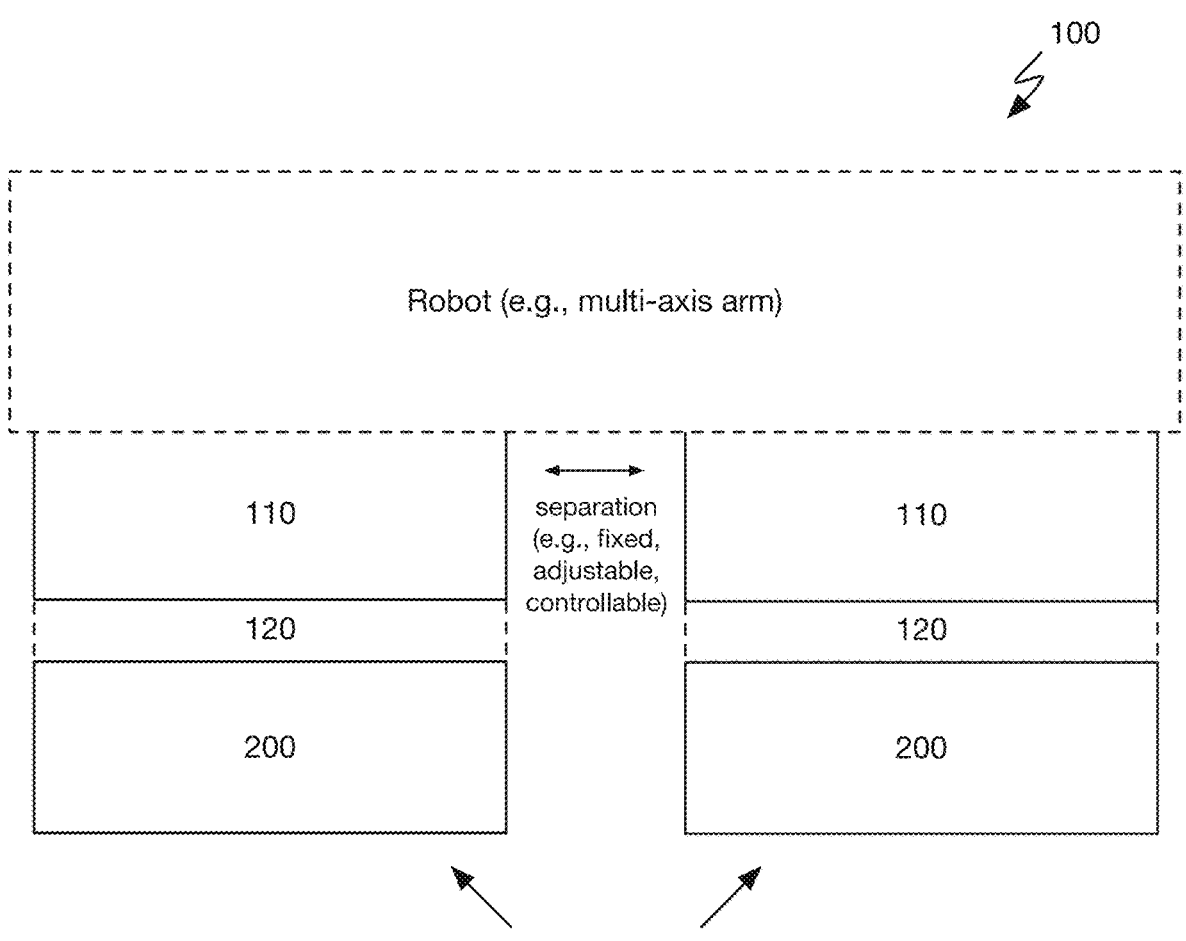
FIGS. 3A-3D are schematic representations of a first, second, third, and fourth variant of the system, respectively.
Figure 3B:
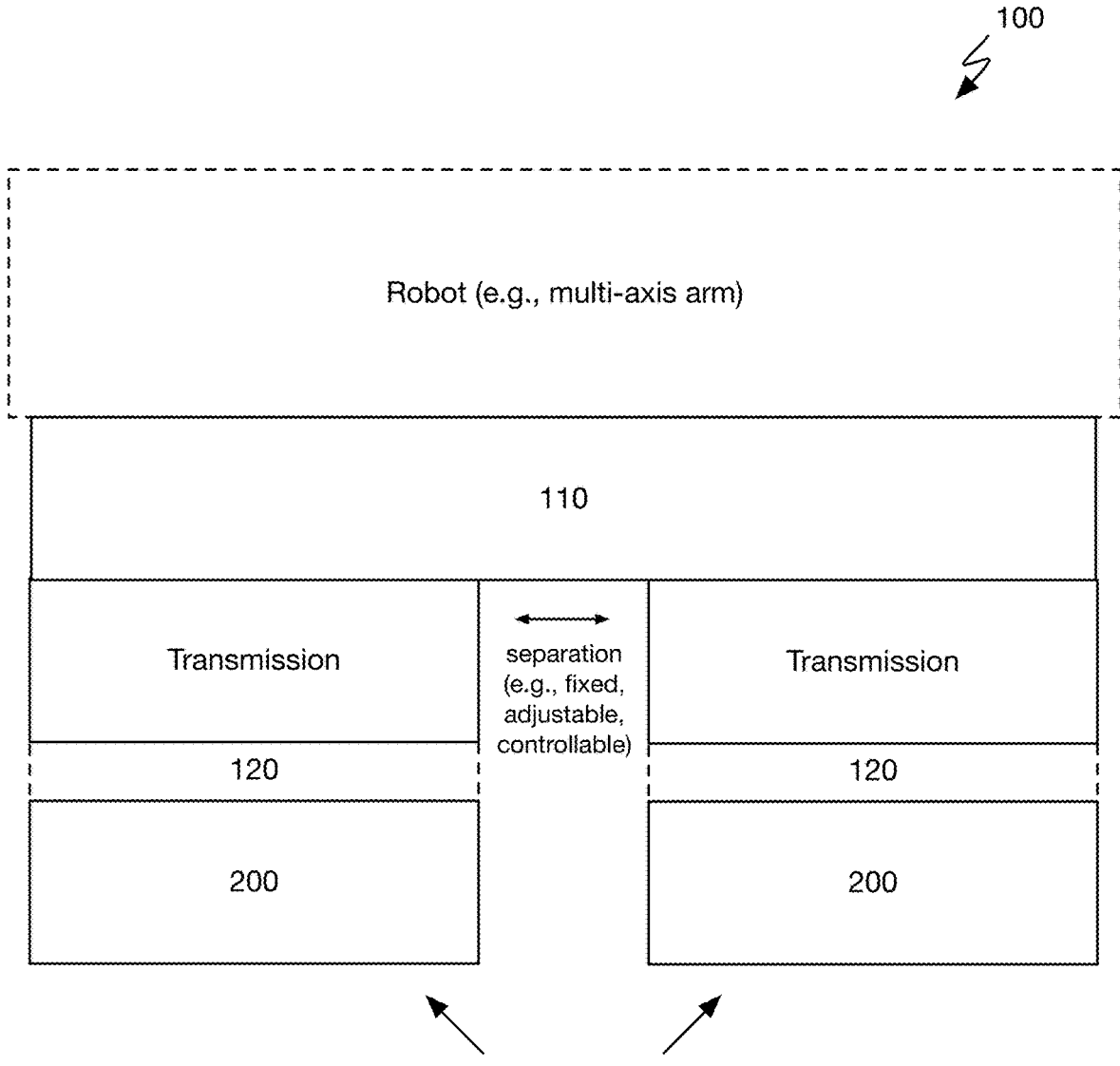
Figure 11:
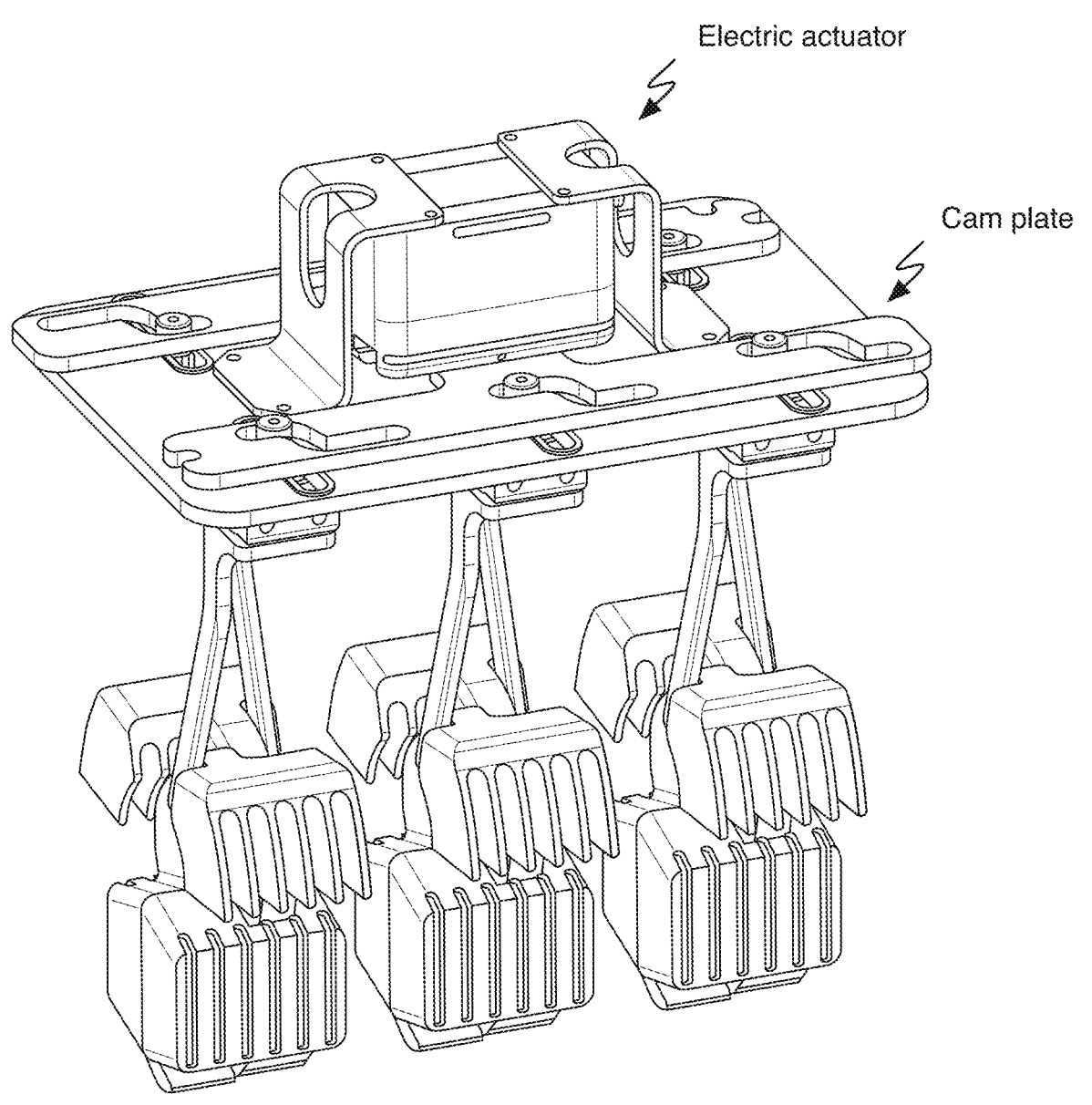
FIG. 11 includes examples of transmission mechanisms in one or more variants of the system.
Figure 13:
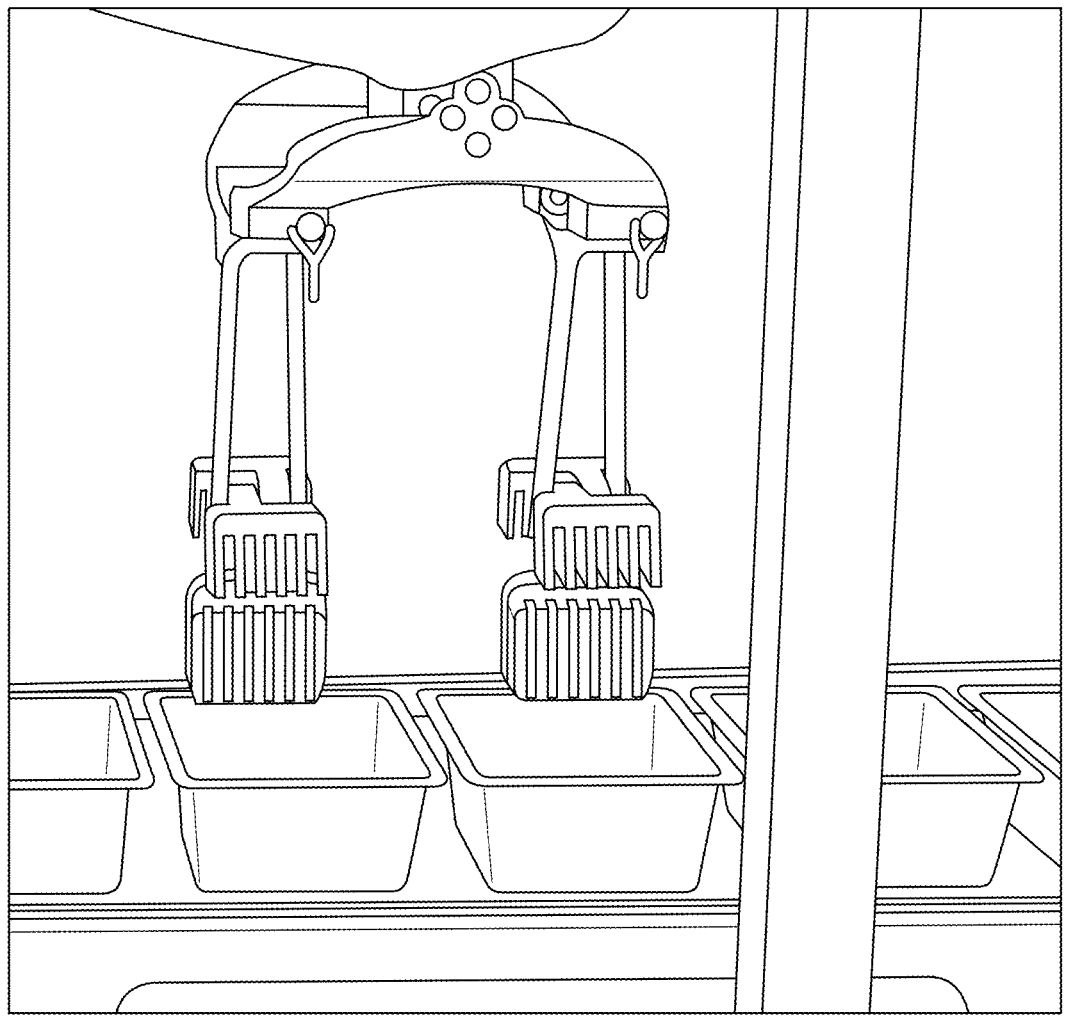
FIG. 13 is an example image of a variant of the multi-deposit end effector.
Figure 14A:
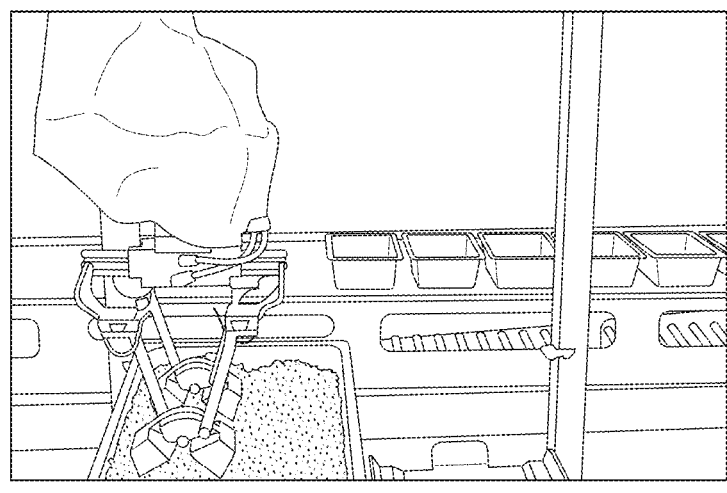
FIGS. 14A-14C are a first, second, and third configuration of a variant of the multi-deposit end effector, respectively.
Figure 14B:
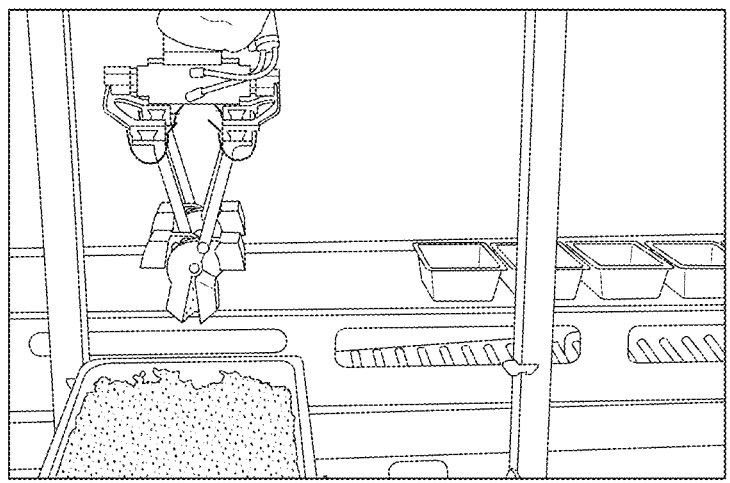
Figure 14C:
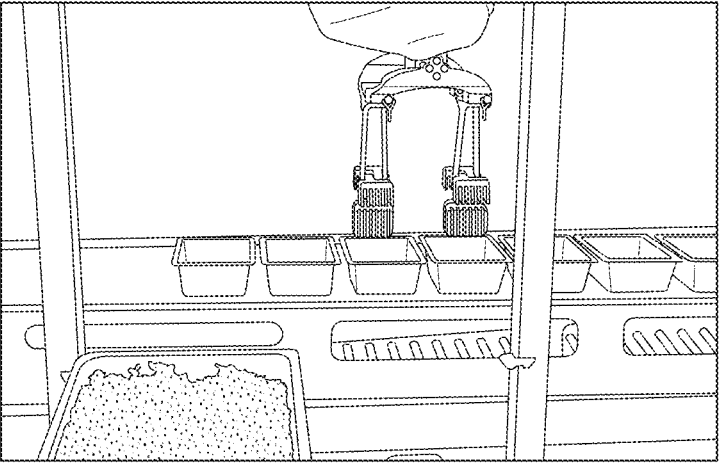
Figure 15A:
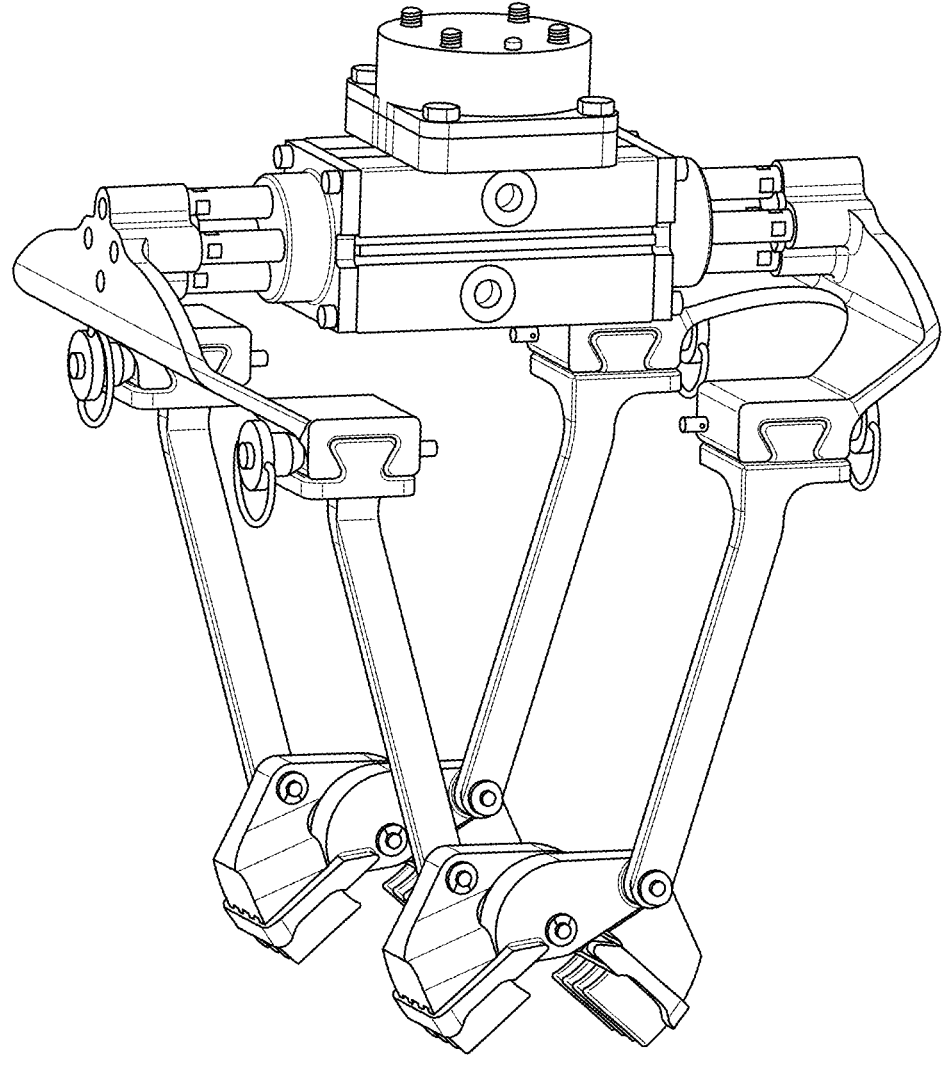
FIGS. 15A-15B are a first and second configuration of a variant of the multi-deposit end effector, respectively.
Figure 15B:
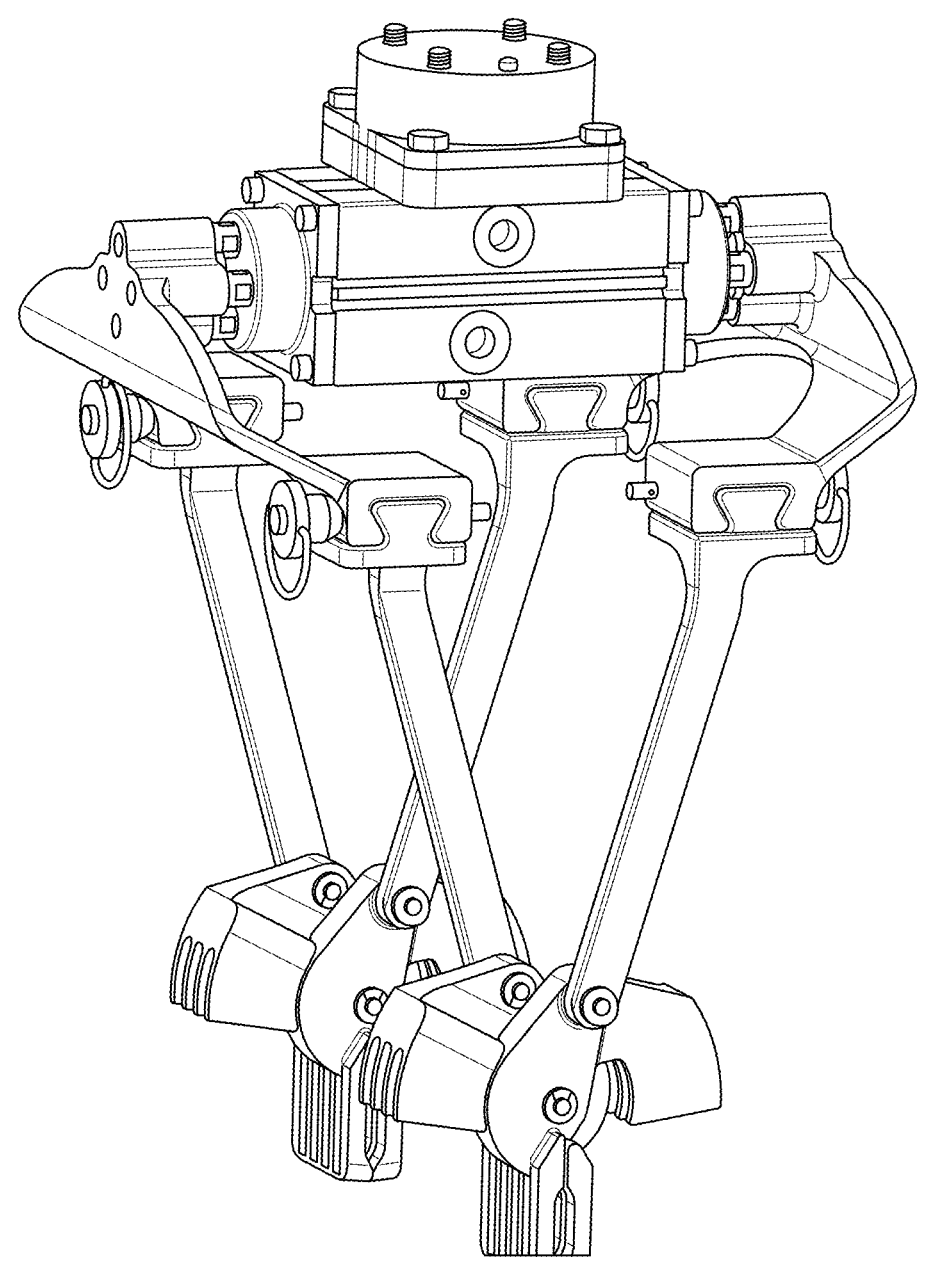

In variants, the actuator(s) can include or operate in conjunction with a transmission (e.g., mechanical transmission, transmission mechanism, etc.), such as to transform the mechanical actuator output (e.g., transforming a rotary output to one or more linear outputs; an example is shown in FIG. 3B). For example, the actuators can include a gear train and/or gear transmission, a set of cams (e.g., bi-directional, spring loaded return, etc.; and/or a cam/follower system), rack-and-pinion mechanism(s), and/or any other suitable mechanical transmissions, which can transform a mechanical actuator output into multiple (N) actuator outputs (e.g., to separately actuate multiple utensils; examples are shown in FIG. 11 and FIGS. 12A-C). In one example, variations can use an electric actuator that can be programmatically started/stopped at various positions to drive multiple utensils to open at different times during different ranges of the actuator stroke (e.g., using a cam plate, an example is shown in FIG. 11). This may allow picking with multiple utensils at the same time, then place with each utensil independently to increase throughput. Additionally, variations can utilize a single electric actuator to accomplish variable opening ranges in the actuator stroke, we have cam followers being driven by cam slots in plates mounted to the actuator. The cam followers are attached to v-block utensil mounts that are only able to slide in the opening direction of the utensils via a key in keyway.

Additionally or alternatively, a utensil mating connector and/or an extension element of a mechanical linkage may likewise transform the actuator output, and/or the actuators can operate in conjunction with any other suitable transmission mechanism(s).

In one set of variants, a rotary actuator and a linear transmission (with as linear travel distance as necessary) could be accomplished with a servo/stepper motor with a rack-and-pinion system to move cam plates with less steep cam angles. For instance, a set of gears (e.g., where diameter=pitch between utensils) with radial slots can be used to drive v-block pins during radial motion, where the radial slots all start/stop at the same diameters. The change in diameter can happen at different points in the radial motion (e.g., to allow asynchronous actuation of multiple utensils) and/or at the same point(s) (e.g., to allow synchronous actuation of multiple utensils. Variations could be driven by a servo/stepper motor, which would allow utensils to open/close at different points in radial travel, and would keep the cams/pins constrained and driven directly by the actuator (e.g., without reliance on springs to open/close on one side). In a second example, variations can actuate each utensil with its own pinion driving both v-blocks via small racks, with all pinions driven by a central mechanism at different ranges in actuator stroke (e.g., which may behave like a central cam plate). Additionally or alternatively, a rotating cam with a spring loaded follower could be used to actuate each utensil (e.g., instead of a cam follower with a cam slot), which may also use a central mechanism to actuate utensils at different ranges in actuator stroke.

Figure 3C:
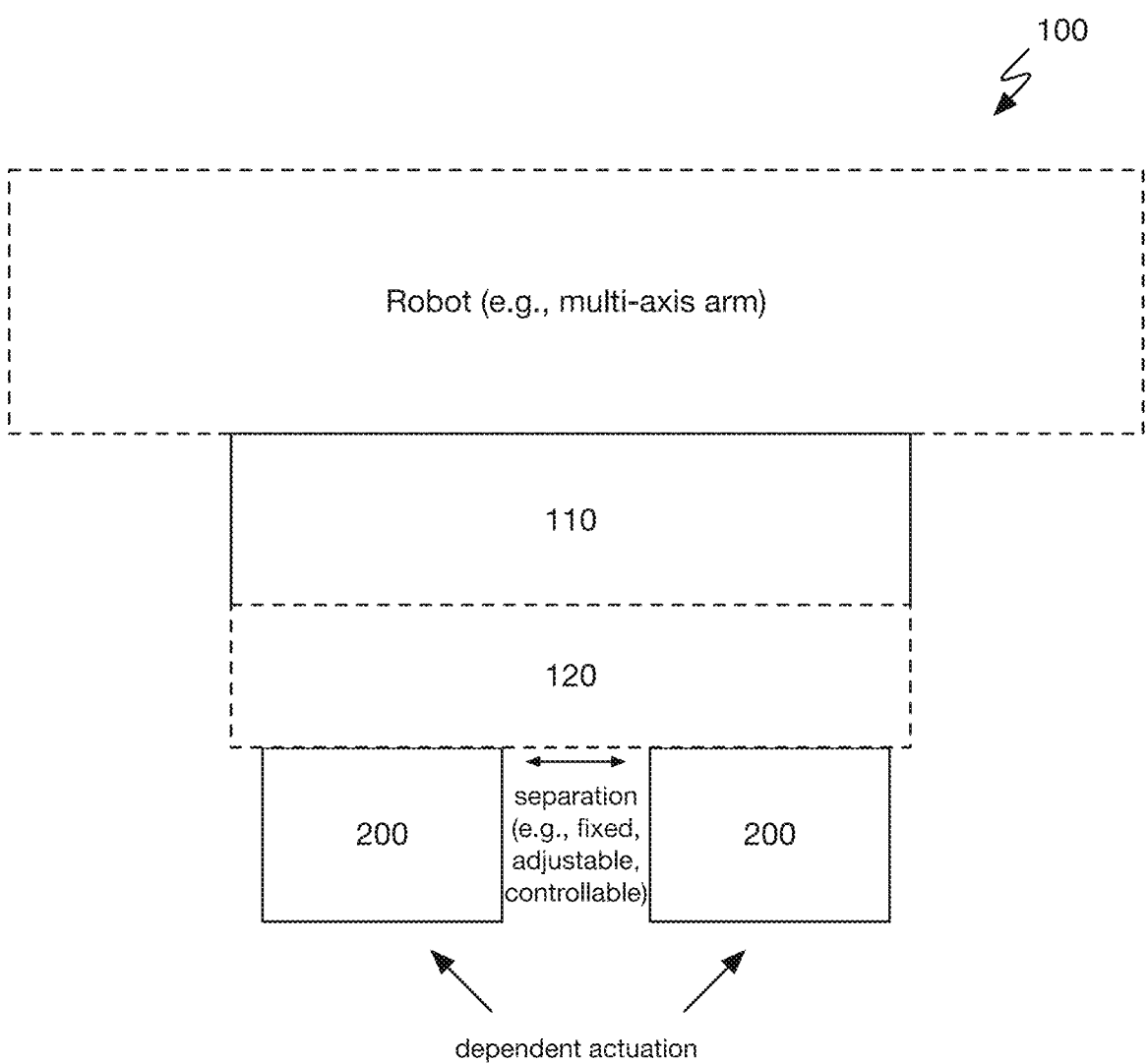

In a second set of variants, multiple utensils can be mounted to the same actuator output (e.g., by a unitary utensil mating connector; an example is shown in FIG. 3C) and driven simultaneously by the same portion(s) of the actuation stroke.

In a third set of variants (e.g., an example is shown in FIG. 3A), each utensil can be mounted to and/or driven by a respective actuator.

The actuator(s) can be communicatively coupled to a robot controller (e.g., electrical communication; fluid communication; etc.) and/or powered by a robot controller or other robotic control system. In variants, the actuator can be a pneumatic actuator driven by a pneumatic pressure within a pneumatic actuation line (e.g., selectively coupled to a pressurized chamber with electronically actuated valves, such as solenoid valves, controlled with the controller). In such variants, the pneumatic line pressure and/or chamber pressure coupled thereto can be controlled, uncontrolled, static, dynamic, and/or pneumatic actuators can be otherwise actuated. For example, in variants, the actuator can actuate the utensil with an input force corresponding to a grasp force (e.g., at a distal end of the scoop) and/or grasp moment based on the pressure of the pneumatic line and/or pressurized chamber. Accordingly, grasp forces/moments can be controlled (e.g., by controlling the pneumatic pressure), dynamic (e.g., based on a dynamic pressure changes of the pneumatic line), predetermined (e.g., based on a manual setting at an HMI and/or a predetermined configuration of a robotic assembly system), static, varied, indirectly controlled, uncontrolled (e.g., not directly controlled), and/or otherwise implemented. In an example, a grasp moment can be a moment of about a hinge axis of a scoop. In a second example, a grasp force can be the force at a distal end of a scoop. In a third example, a grasp force can be the force between a scoop and foodstuffs at a contact point. However, the actuator can be otherwise suitably actuated.

Figure 3D:
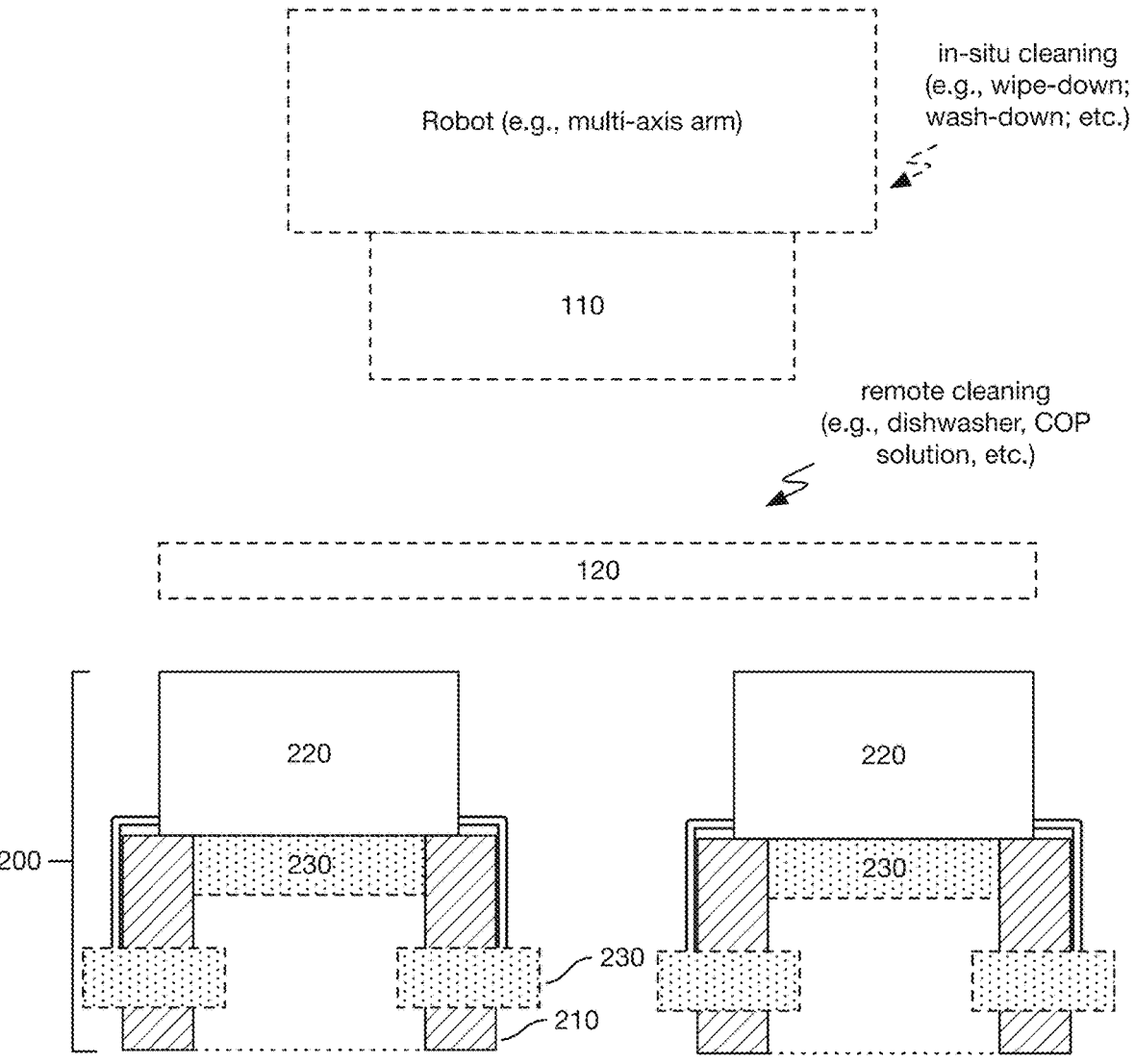

In variants, the actuator(s) (and/or the robot supporting the actuator) can optionally be housed within and/or contained by a suit (a.k.a. jacket) which functions to enable cleaning and/or functions to protect actuator from particulate ingress or soiling. The suit can be disposable (e.g., enabling cleaning by replacement of the suit), removable (e.g., manually removed for cleaning, such as via a machine wash; an example is shown in FIG. 3D), and/or cleanable by wipe down and/or wash down processes. The suit can be sealed against the robot, meeting or exceeding IP67 standards (e.g., separating the enclosed volume of the suit from the utensil), but can be otherwise suitably implemented. As an example, the actuator can be enclosed by a single suit which is formed with heat welded or sonically welded seams. However, the actuator can otherwise be unenclosed (e.g., designed to satisfy food compatibility and/or ingress protection standards; such as IP67 and/or NSF food safety compliance standards) and/or used without a suit or covering (e.g., such as in secondary applications, line operations which do not involve food, etc.).

However, the system can otherwise include or be used in conjunction with any other suitable actuator; or can otherwise altogether exclude an actuator.

3.2 Utensil Mating Connector(s)

The end effector and/or utensil(s) thereof can optionally include or be used in conjunction with a set of utensil mating connector(s) 120 which functions to mount the utensils to the actuator(s) along a mating interface. Additionally or alternatively, the utensil mating connector can function to transfer forces/moments between the set of mechanical linkages and the actuator (e.g., actuating ends thereof). Additionally or alternatively, the utensil mating connector(s) can function to facilitate utensils to be interchangeably swapped (e.g., for ingredient-specific utensils and/or utensils to be swapped based on a desired pick amount) and/or removed (e.g., to facilitate remote/dishwasher cleaning; example configurations are shown in FIGS. 2A and 2B).

The utensil mating connector preferably defines a mating interface (e.g., pair of opposing bearing surfaces in contact), which may facilitate attachment and/or removal of the utensil. More preferably, the mating interface preferably facilitates a tool-less, quick removal (quick-release) and/or attachment. In order to facilitate the quick attachment and detachment of utensils from the robotic system in the field for the cleaning of used utensils or for switching to another utensil for a different ingredient, tool-less mechanisms can be changed quickly by hand. More preferably, the mating connector is configured to maintain a tight/substantially-rigid interface between the fingers and components attached to the gripper, so that the motions of the utensil can be precisely controlled by the gripper without any backlash (e.g., less than 0.1 deg angular backlash, less than 0.2 mm, less than 0.05 mm, less than 0.02 mm, zero backlash, etc.). For example, the mating interface can be a linear plain bearing slide (e.g., dovetail, boxway, bushing, etc.) or rotational interface (e.g., cam lock, screw, conic interface, etc.). The mating interface can be secured manually (e.g., pinned), automatically (e.g., by a pneumatic collar, by an electromechanical or magnetic retention mechanism; by a passive retention spring; etc.), actively, passively, and/or via any other suitable fasteners or retention features. As an example, the mating interface can be secured by way of a snap-fit, mechanical quick-disconnect, ball-latching interface, pinned interface, and/or any other suitable retention mechanism(s).

In one variant, the utensil mating connector(s) can include a tapered dovetail connection(s). A slight taper angle (e.g., 0.5 degrees to 2 degrees; 1 degree taper) and a tight manufacturing tolerance (e.g., tolerance of 0.02 mm or less, etc.) may increase overall rigidity and assembly robustness. For example, tapered connections, particularly when used in conjunction with manual assembly indicators (e.g., arrows, assembly indicator markings, etc.) may poka yoke the system by eliminating possibility of incorrect/unintended assembly configurations which are visually similar to the nominal assembled configuration (e.g., particularly when elements have a high degree of symmetry). Additionally or alternatively, the tapered dovetail may eliminate assembly symmetry of the system (e.g., where there is exactly y one assembly direction/configuration). Tapered dovetails can be manufactured by wire EDM or another material removal manufacturing process (e.g., CNC milling, etc.), but can be otherwise formed/fabricated.

In variants, such quick-change mechanisms may allow the same actuator (and/or robot) to be efficiently used with different utensils and, accordingly, allow the same actuator to manipulate different ingredients, pick different portion sizes, and/or place at different endpoints.

The utensil mating connector(s) can include and/or interface with an extension element(s) which can function to physically distance the utensil from the actuator (and/or robotic assembly system). In particular, physically distancing the utensil from the actuator may advantageously distance the robot and/or end effector from the food ingredients being manipulated, reducing the potential for soiling and/or collisions. Further, physically distancing the utensil from the actuator may dissociate the physical footprint of the actuator (and/or terminal end of a robot arm) from the utensil, allowing food manipulation by the utensil to be unhampered (e.g., when reaching into deep containers and/or food pans) by dimensional constraints of the actuator. As an example, the extension element may facilitate utensil accesses a pick area (and/or volume) within a food container which is independent of actuator dimensions, thus allowing the use of larger actuators to achieve greater forces and/or stroke lengths (e.g., which can increase the versatility and/or efficacy of various utensils). As a second example, the extension elements may allow separate bounding boxes (e.g., with separate footprints) to be utilized for the utensil and the actuator. Accordingly, in variants where the extension element increases the length of the tool to greater than a depth of a foodstuff bin (e.g., 2.5 inches, 4 inches, 6 inches, 8 inches, greater than 8 inches, etc.), the driving collision constraints can be based on the pick depth and an offset of the utensil footprint relative to the foodstuff bin wall(s), as opposed to being driven/limited by the collision box of the actuator. However, the actuator may drive various collision constraints (e.g., internal/self-collisions, etc.) and/or the utensil can be otherwise controlled based on any suitable collision constraints.

Extension elements are preferably oriented to offset the utensil along a direction perpendicular to an actuation input (e.g., relative to a direction of a linear actuation; relative to an axis of rotational actuation), but can alternatively extend in the same direction as the actuation input (e.g., for vertical-acting actuators), be angled/skewed, and/or otherwise offset the utensil from the actuator. In variants, extension elements can be oriented to offset the utensil along a direction perpendicular a mating interface and/or mating fastener (e.g., perpendicular to pinned connection; perpendicular to a direction of a dovetail mate; etc.). As an illustrative example, where a robot may generally execute picks substantially vertically in a "top-down" direction, extension elements may be individually or collectively oriented substantially vertically in nominal operating configurations (e.g., at time of actuator actuation, during pick execution, during insertion, etc.; with a vertically oriented V-shape), offsetting the utensil from the actuator in a vertical direction. In variants, the extension elements can be sized based on a depth of a foodstuff bin and/or maximum pick depth (e.g., which may allow ingredient picking without the actuator entering an interior volume of a foodstuff container). In a first example, the extension element(s) can offset the utensil from the actuator by: less than 5 cm, 5 cm, 8 cm, 10 cm, 12 cm, 15 cm, 20 cm, 25 cm, 30 cm, 50 cm, greater than 50 cm, any range bounded by the aforementioned values, and/or any other suitable distance. In a second example, a combined length (e.g., maximal length, in an open configuration, in a closed configuration, etc.) of the extension element and the utensil is larger than a depth of an ingredient bin. In a third example, the extension elements can have a length which is greater than an actuation distance of the actuator and/or actuation input (e.g., double, triple, quadruple, etc.; which may advantageously dissociate the physical/collision footprint of the actuator from that of the utensil and/or increase the actuation distance relative to the minimum effective linkage length at the actuation end).

Preferably, a utensil mating connector establishes a (passive) mechanical connection between each actuation end of the actuator and the utensil (e.g., a corresponding element of a mechanical linkage thereof), but can otherwise suitably connect the actuator and the utensil. Accordingly, a utensil mating connector can include a first component mounted to the actuator (and/or integrated with the actuator), which interfaces (via the mating interface) with a second component connected to the utensil. The extension can be at the utensil side of the mating interface (e.g., an extension element can include the features defining the utensil side of the mating interface) and/or at the actuator side of the mating interface. As an example, the mating interface can be proximal to the actuator (e.g., closer to the actuator than the grasp cavity) or proximal to the utensil (e.g., closer to the grasp cavity than the actuator.

In a specific example, the utensil mating connector can include a pair of tapered dovetail joints defining substantially parallel primary axes (respective assembly directions, etc.) and retained with manual retention pins which are substantially orthogonal to the respective primary axes.

The utensil mating connector(s) and/or components thereof can be manufactured from titanium, stainless steel, aluminum (e.g., anodized), but can include any other suitable materials or material composition. The utensil mating connector(s) can be manufactured by a material removal process (e.g., wire EDM, CNC milling, etc.), but can additionally or alternatively be fabricated by casting, forming, additive material processes, and/or can be otherwise fabricated.

However, the system can otherwise include or be used in conjunction with any other suitable mating components/connector; or can otherwise exclude a utensil mating connector. As an example, the set of mechanical linkages can be directly integrated with an actuator and/or otherwise mated to an actuator.

In an example, the actuator and the utensil mating connector cooperatively define a first footprint, wherein the foodstuff utensil defines a second physical footprint, wherein a vertical projection of the first footprint extends at least partially beyond the second footprint (e.g., in one or more configurations; covering a larger area; spanning a greater length and/or width, etc.).

4. Utensil

Figure 2:
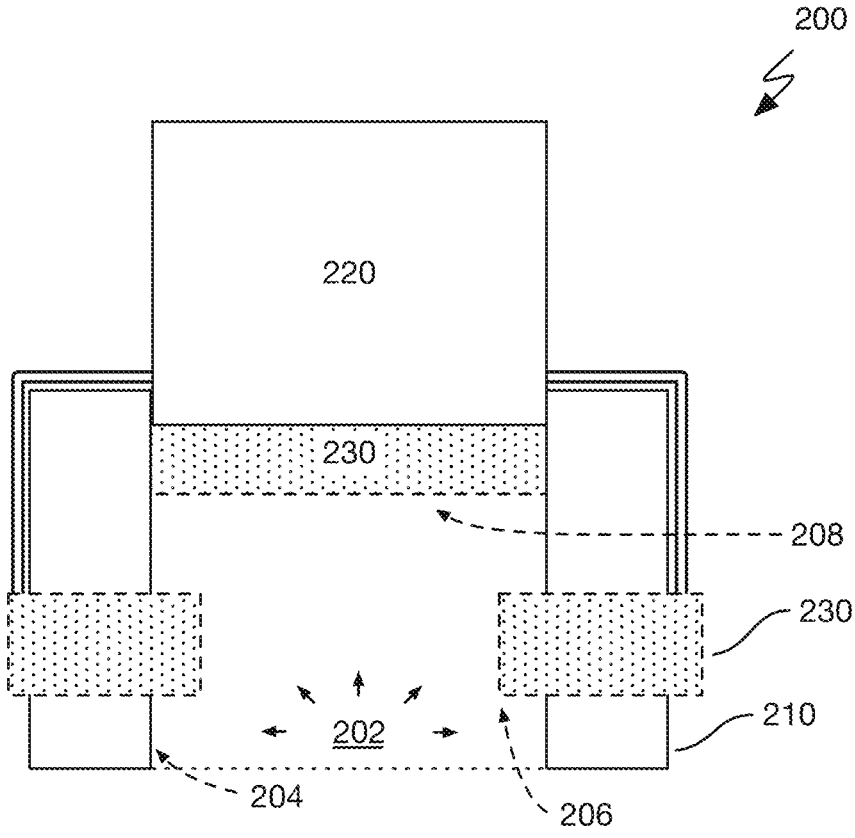
FIG. 2 is a schematic representation of a variant of a utensil.

The utensil 200, an example of which is shown in FIG. 2, can include: a set of scoops 210; a set of mechanical linkages 220; a set of ingressive elements 230; and/or any other suitable components. The utensil 200 functions to grasp and/or manipulate foodstuff ingredients within a grasp cavity to facilitate ingredient picking (e.g., from an ingredient bin) and/or insertion (e.g., into a foodstuff container). Additionally or alternatively, the end effector system can function to evacuate ingredients from the grasp cavity (e.g., clearing out ingredients adhering to the utensil). Additionally or alternatively, the end effector system can function to shape a profile of ingredients (e.g., upon insertion). The utensil can include: a set of scoops; a set of mechanical linkages; a set of ingressive elements; and/or any other suitable components. However, the end effector system 100 can additionally or alternatively include any other suitable set of components.

The utensil and/or each component thereof is preferably passive (i.e., unpowered), transforming entirely based on mechanical transformations of the actuator and/or utensil mating connector(s). For example, the utensil may include no electrical, pneumatic, or hydraulic actuators (e.g., which may facilitate cleaning by submersion, such as in a COP solution, and/or dishwashing).

The utensil and/or each component thereof is preferably constructed from a polymer material (e.g., PolyOxyMethylene [POM] a.k.a. acetal, such as Delrin® from DuPont™; thermoplastic; etc.), but can alternatively be metal (e.g., titanium, stainless steel, aluminum, etc.) but can include any other suitable materials or material composition. The utensil can include or be coated with ceramic, Polytetrafluoroethylene [PTFE], and/or another material to prevent stickage (e.g., adhesion), but can be otherwise coated/uncoated (e.g., anodized or powder coated). The surfaces of the utensil (e.g., such as the grasp surfaces, ingressive surfaces, and/or shaping surfaces) are preferably smooth and easily cleanable (e.g., in accordance with NSF requirements); however, the utensil can be otherwise textured/coated.

In variants, the utensils and/or components thereof can have an exterior appearance which is visually distinct from a set of target ingredients, which may facilitate visual identification/distinction of the utensil and foodstuff ingredients. In such variants, a color range of the utensils and/or a set of components thereof can be offset from a color of a target ingredient (or set of foodstuff ingredients) by a color distance. In an example, the food utensil and/or components thereof (e.g., scoops, ingressive elements, etc.) can be substantially blue (e.g., R: 0, G: 0, B: 255; etc.), while ingredients/foodstuffs may be separated from the color blue by at least a threshold color distance (e.g., where the overwhelming majority of foodstuffs are not blue; where the range of foodstuff ingredients being picked are not blue; where the threshold value is predetermined minimum value). For example the scoop and ingressive elements can have at least a minimum color distance to various sets of foodstuffs (e.g., set of all ingredients, target ingredient of the utensil, etc.), which can have a value of: less than 10, 25, 50, 75, 100, 125, 150, 200, greater than 200, any open or closed range bounded by the aforementioned values, and/or any other suitable minimum color distance(s) (e.g., to enable separate visual identification of utensils and foodstuffs). For instance, blue utensils and/or utensils separated from foodstuff by at least a predetermined color distance may allow human operators and/or CV-based quality control systems to verify that no chipped/broken pieces of a utensil are present in an assembled bowl of foodstuff (e.g., as a verification/validation measure). In one set of variants, a color range of each scoop of the plurality and each ingressive element of the set satisfies a minimum color distance from an aggregate foodstuff ingredient. In an example, at least one of the plurality of scoops is blue.

The various components (or sub-components) of the utensil can be integrated into a unitary body, or can be formed by multiple distinct bodies (e.g., which may be constructed of the same material or different materials; which may be mechanically coupled, fastened, bonded, etc.) in any suitable combination. For example, an element of a mechanical linkage may be integrated with a body of one scoop and one ingressive element (e.g., an example is shown in FIG. 4).

The set of scoops 210 function to house, retain, and/or grasp ingredients in a grasping configuration (e.g., within a grasp volume; against a grasp surface). The set of scoops can define a grasp cavity (e.g., graspable volume of foodstuff ingredients), bounded by a grasp surface of the scoop which establishes physical contact with the foodstuff (e.g., in a grasp configuration). The grasp cavity is preferably at least partially unenclosed in a grasp configuration of the utensil. As an example, the scoops can include a set of orifices (equivalently referenced herein with the term 'apertures') which fluidly couple the grasp cavity to an ambient environment (e.g., air may pass through the thickness of the scoops via the orifices/apertures). The grasp surface can be uncoated/unfinished (e.g., stainless steel) or coated (e.g., ceramic coating; PTFE coating; food-compatible anodize or powder coat; etc.)

The scoops are preferably dimensioned to define a grasp cavity which may retain a predetermined amount (e.g., mass and/or volume) of ingredients. Accordingly, in various implementations, varying amounts of ingredients may be picked by: varying the actuation input and/or control of the robotic system (e.g., pick height above ingredients, etc.; controlling the effective utilization of the grasp volume) and/or by selectively interchanging the utensils based on the size of grasp volume.

Figure 4:
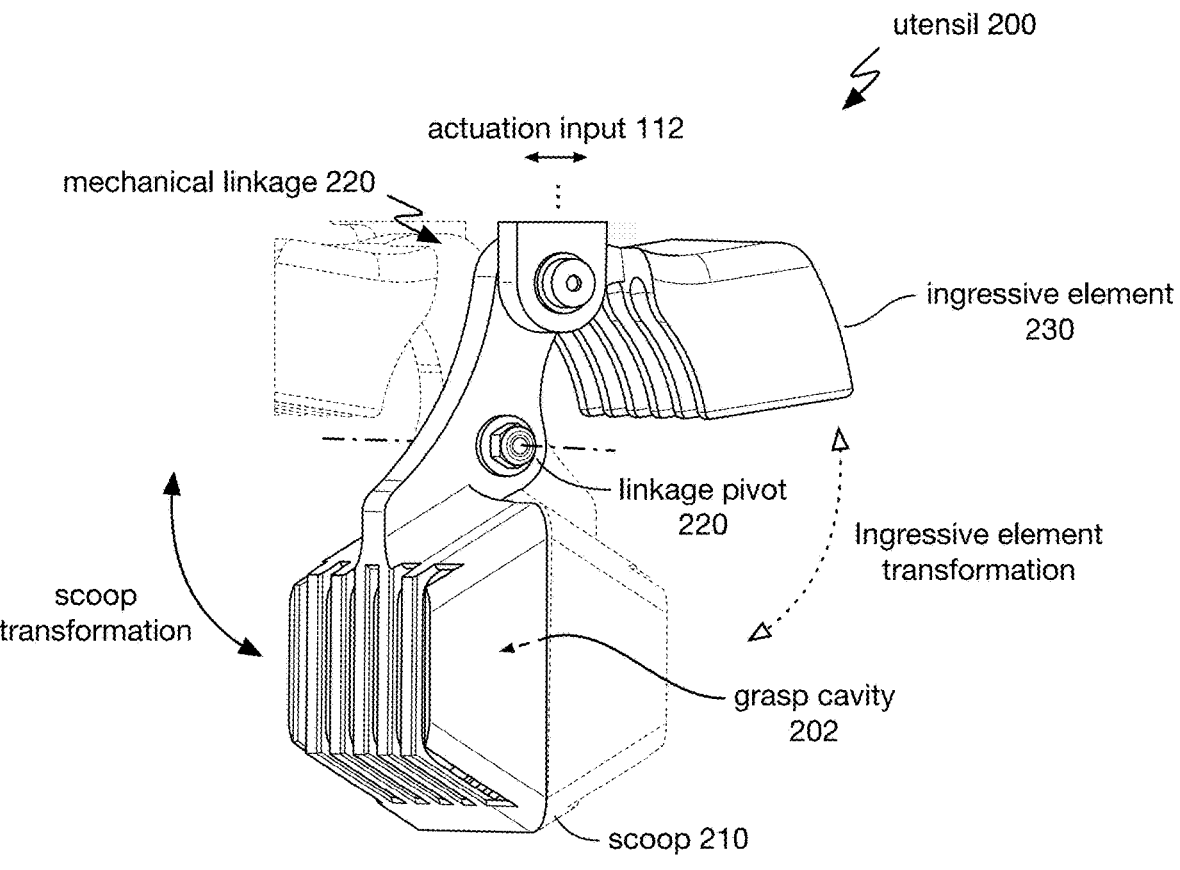
FIG. 4 is an isometric view of a variant of a utensil.
Figure 5:
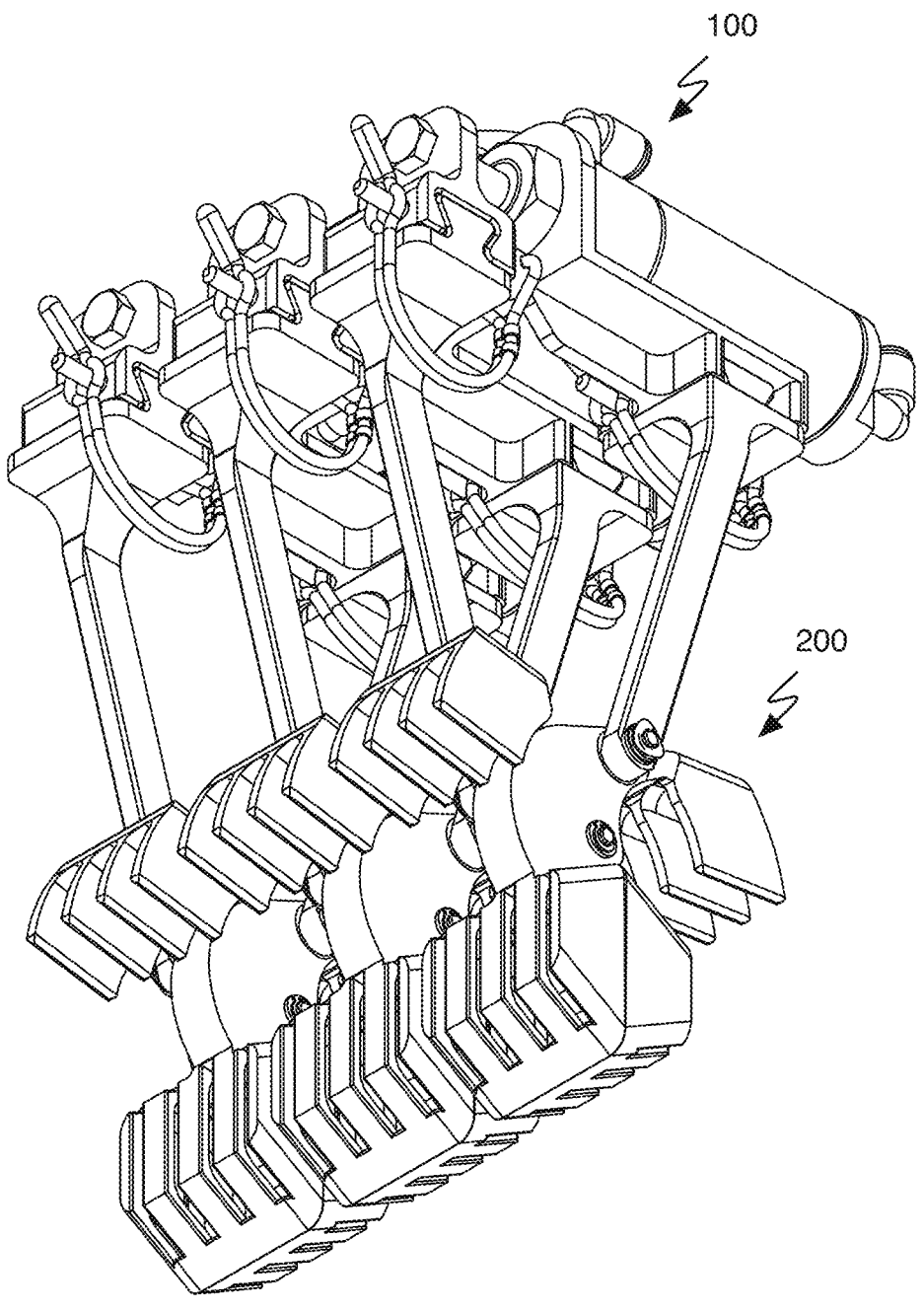
FIG. 5 is an isometric view of a variant of the multi-deposit end effector system.

The utensil can include a singular scoop (e.g., an example is shown in FIG. 4) or multiple scoops (e.g., two, three, more than three, etc.). In one set of variants, the utensil can include a pair of scoops, such as may provide clamshell engagement (e.g., substantially symmetric, pairwise symmetry relative to a central plane). The geometry of scoops can be: clamshell-shaped, shaped a bucket of an excavator/digger, prismatic, concave (and/or include convex portions), define a substantially uniform cross section (e.g., relative to an actuation axis) and/or have any other suitable structure or geometry(ies). Likewise, the grasp cavity can be: prismatic (e.g., a hexagonal prism shape in the first configuration), cylindrical (e.g., in a first configuration), semi-cylindrical, partially cylindrical, semi-spherical (or partially spherical), conical, and/or any other suitable geometry(ies). In one set of variants, each scoop of the plurality is integrated with at least one ingressive element as a unitary body. In an example, the set of scoops include a first scoop integrated with a first set of ingressive elements as a first unitary body, and a second scoop integrated with a second set of ingressive elements as a second unitary body, wherein the first and second unitary bodies are substantially symmetric.

In variants, a distal portion of the scoops (e.g., relative to the actuator; opposite a structurally mounted end of the scoops) can include teeth or other extrusions/projections. Teeth can interdigitate in the second configuration and/or define a cusp-to-fossa relationship, or may be mirrored about a midsagittal plane. Alternatively, the scoops can interface at an edge (e.g., linear, curved, etc.; an example is shown in FIG. 4). Alternatively, the scoop edges (e.g., distal edges) can be separated by a gap in the closed configuration (and/or can be actuated to partially close in some configurations, such as when grasping brittle ingredients). Teeth may function to agitate food particles (e.g., particularly large food particles, frozen food conglomerates, substantially nondeformable food particles, etc.) during actuation/grasping and/or retain food particles (e.g., when the tool does not fully close, such as may occur for non-homogeneous conglomerates and/or frozen particulates), by increasing edge length along a distal-most edge (i.e., greater edge length and surface area for agitating foodstuffs, greater edge length and surface area for retaining foodstuffs; relative to the grasp volume). However, the scoops can alternatively exclude teeth and/or be otherwise configured.

The scoops can be mounted/coupled to: the actuator (e.g., an actuated end of the actuator, a central body of the actuator), a utensil mating connector, and/or the set of mechanical linkages. In variants, the scoop may form a link and/or element of the set of mechanical linkages (e.g., an element of a 3-bar linkage, an element of a 4-bar linkage, for example; a lever arm; etc.) and thus may be integrated with the set of mechanical linkages. Alternatively, the scoop can be coupled to a distal end of a mechanical linkage (e.g., opposite an actuated end) and/or can be separate from the set of mechanical linkages (e.g., an example is shown in FIG. 4). However, the scoops can be otherwise mounted.

In variants, the scoops (and/or the grasp cavity defined thereby) can be statically mounted relative to the body of the actuator or can be actuated based on the actuation input (e.g., via the mechanical linkages). The scoops can retain foodstuff ingredients in a first (e.g., grasping) configuration by: containment/enclosure (e.g., largest orifice of scoops and/or grasp cavity is smaller than an ingredient dimension and/or characteristic length), compression/squeezing (e.g., relative pose maintained based on static friction), adhesion (e.g., sticky and/or deformable materials retained against the grasp surface of the scoops), and/or via any other suitable grasping/retention forces.

Figure 6:
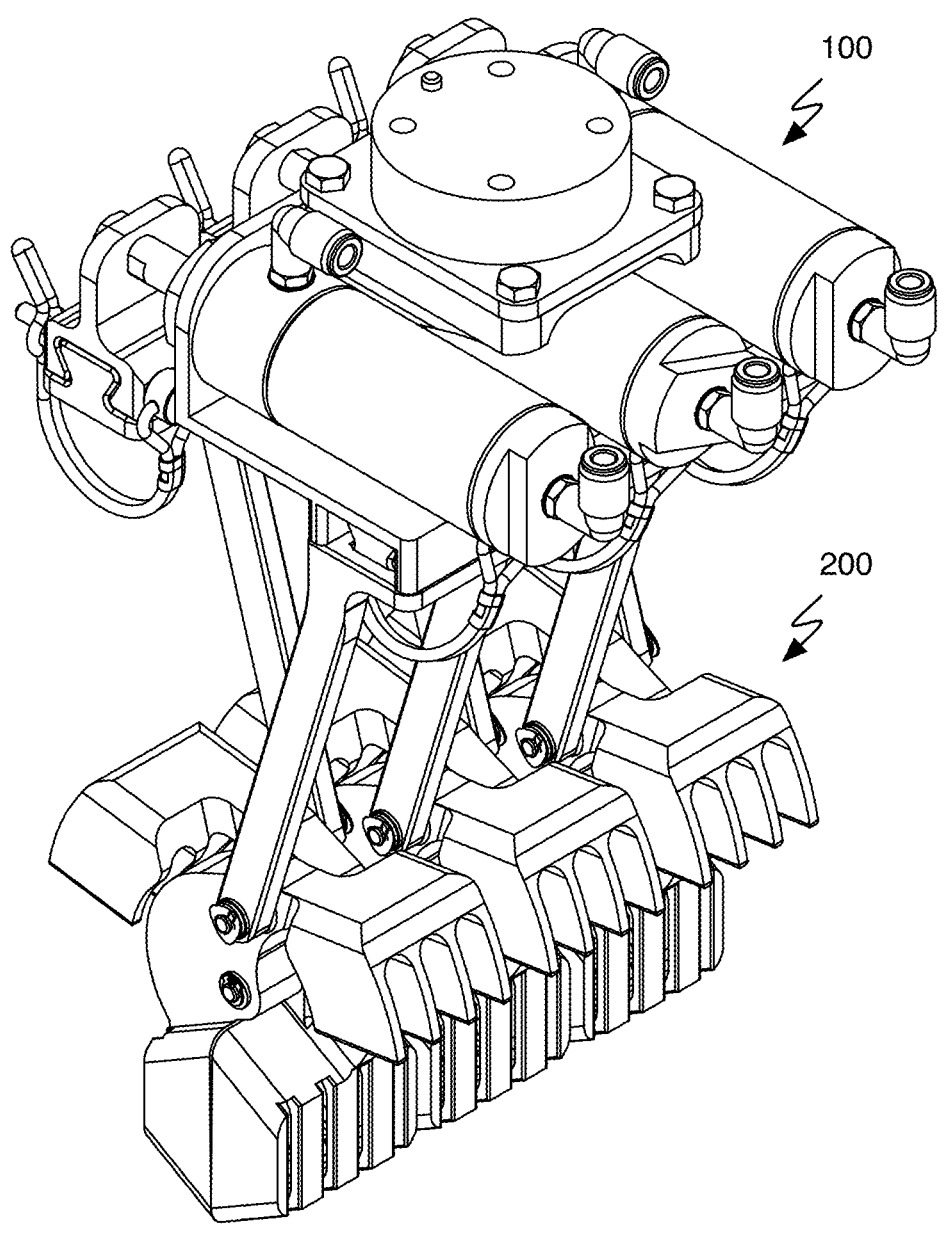
FIG. 6 is an isometric view of a variant of the multi-deposit end effector system.
Figure 7:
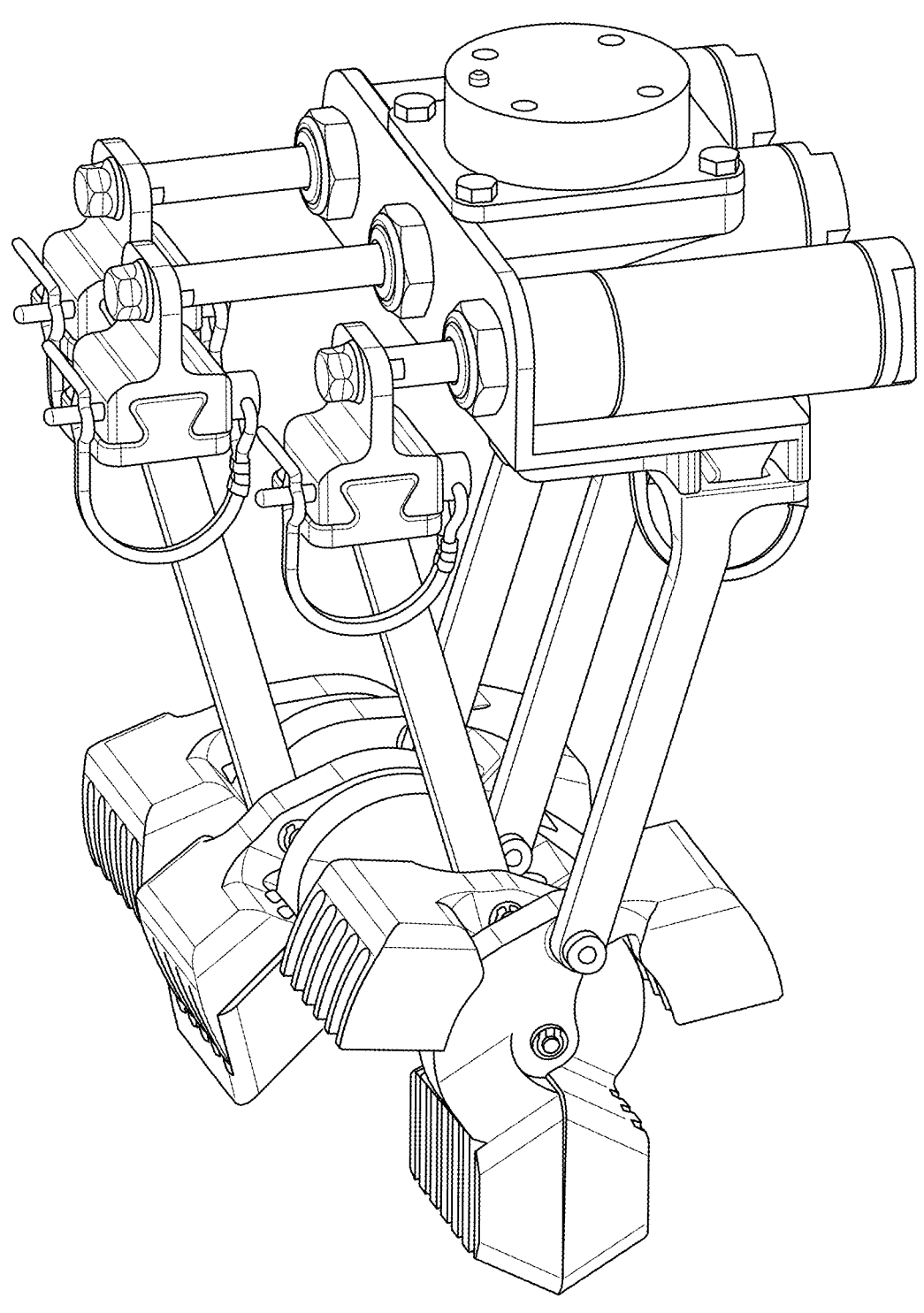
FIG. 7 is an isometric view of a variant of the multi-deposit end effector system.
Figure 8:
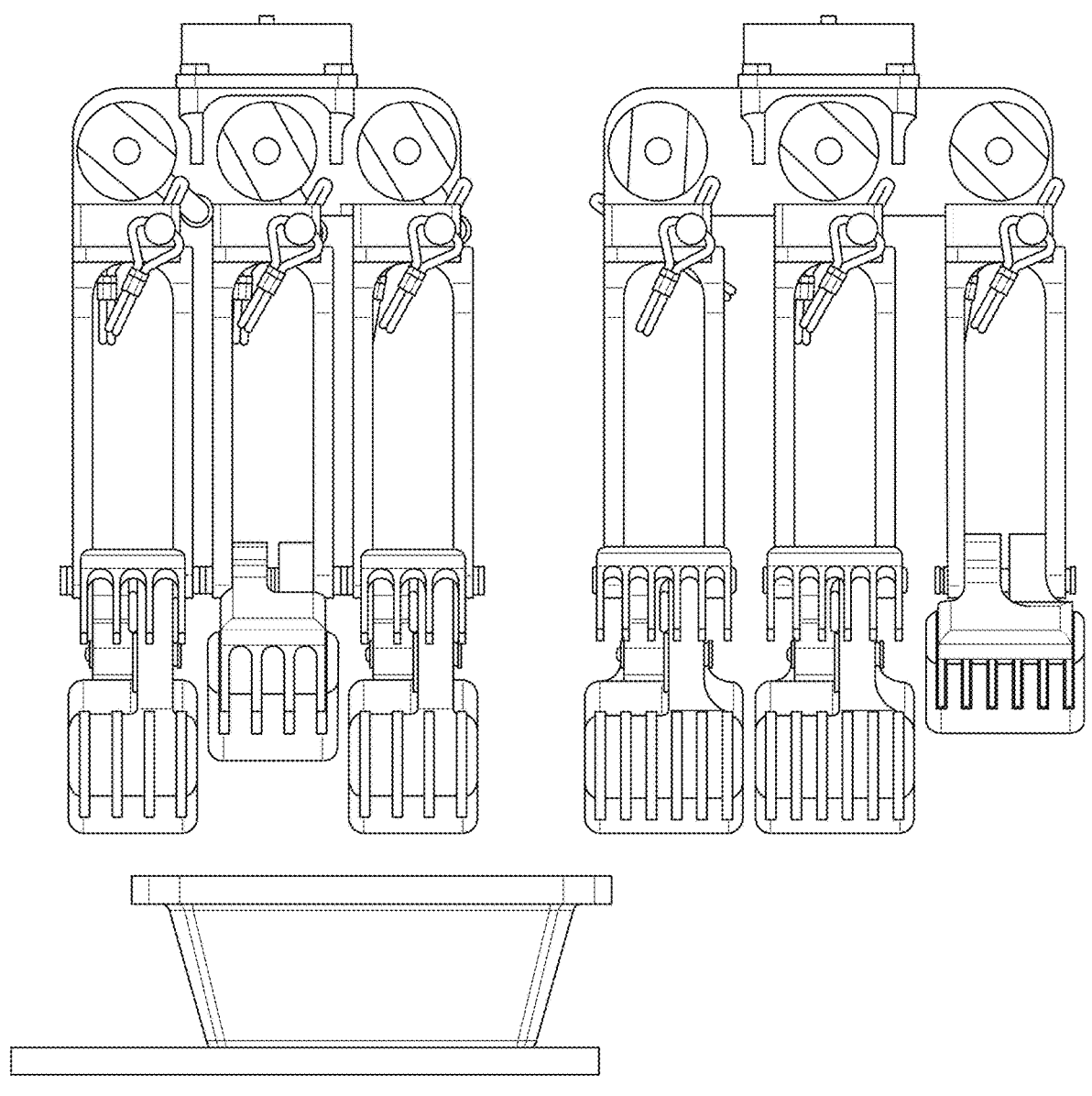
FIG. 8 is a side view of a variant of two multi-deposit end effector systems in different configurations, in proximity to a container.
Figure 9:
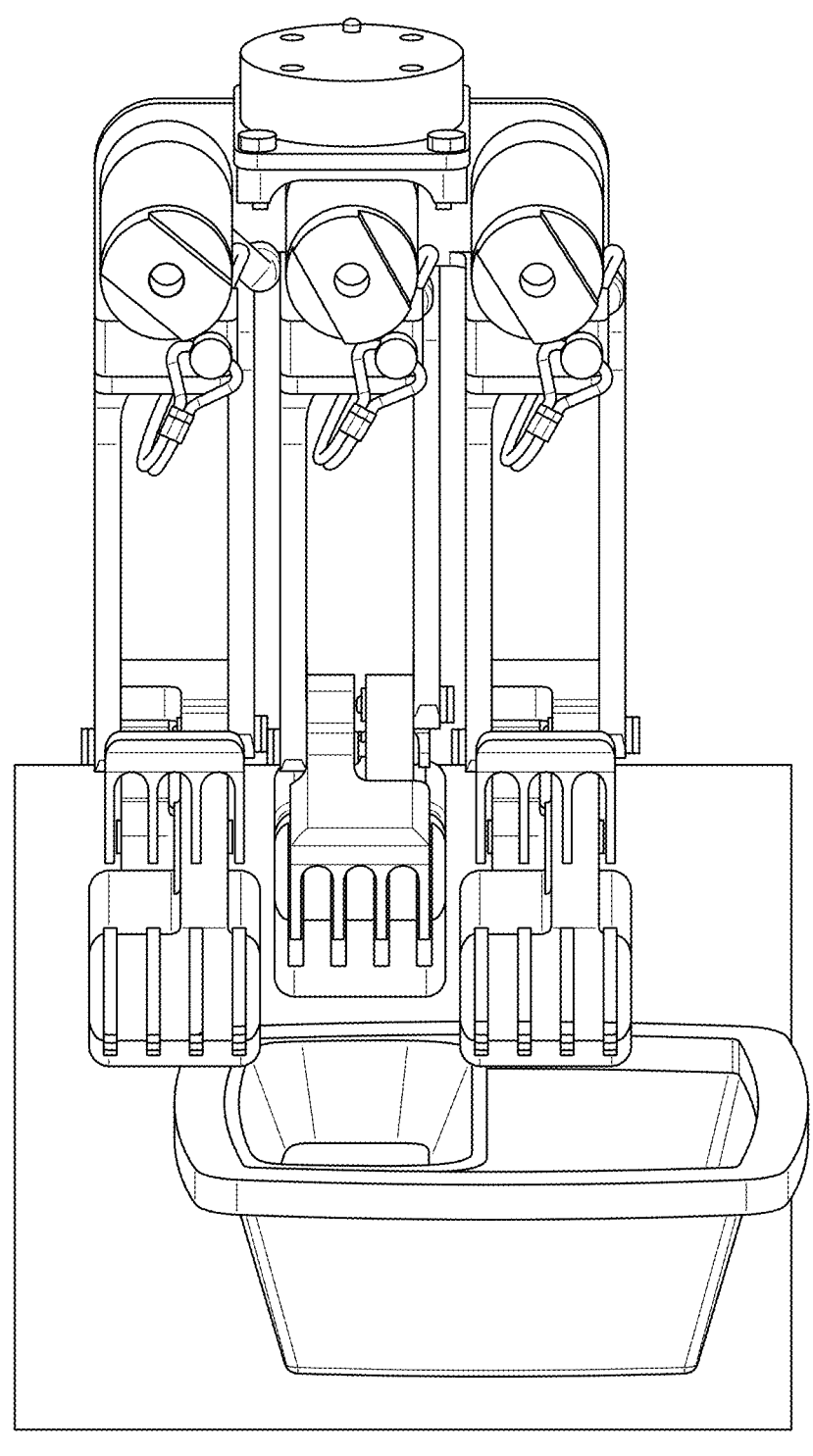
FIG. 9 is a 3D view of an example configuration of a variant of a multi-deposit end effector system, with one utensil open above a container.

In a first set of variants, the scoop can actuatable/transformable, such as a scoop, claw, and/or finger of a gripper-style utensil. In such variants, scoops can be transformed between the first configuration (e.g., grasp configuration) and a second configuration (e.g., anti-grasp configuration; ingressive configuration; open configuration, etc.) along a trajectory which can include linear transformations, rotational transformations, and/or any suitable transformations in SO(3). For example, in some variants, the scoop(s) can be transformed along a trajectory between the first and second configurations which may be parameterized as a 1-dimensional rotation (e.g., about an axis of rotation), which may minimize a resulting deformation/compression of ingredients (e.g., which may be particularly beneficial when such compressions may degrade ingredients, such as breaking cereal, etc.) for scoops geometries with substantially uniform radial geometries about the axis of rotation. Alternatively, the transformation can include rotational and linear components (e.g., an example is shown in FIG. 6; motion may be parameterized as a minimum of 2-dimensional components; etc.), and/or can have any other suitable motion.

In a second set of variants, the scoop can be statically mounted relative to the body of the actuator. In such cases, the actuator itself may be transformed (e.g., by a robotic arm and/or robotic assembly system), cooperatively transforming the actuator, scoop(s), and grasp cavity while in a first configuration. For example, the scoop may be pressed into a bin of ingredients while in the first configuration (e.g., where a transition to the second configuration forcibly ejects foodstuff from the grasp cavity).

The scoops can include and/or define a set of orifices (a.k.a., apertures) which fluidly connect an interior volume and/or grasp surface of the grasp cavity to a fluid exterior (e.g., ambient air surrounding the end effector) and/or allow ingress of the set of ingressive elements into the grasp cavity in the anti-grasp configuration. Orifices can include holes (e.g., through-holes), slots, material cutouts, material voids, and/or any other suitable orifices/apertures with any suitable material cross-sectional geometries. For example, the apertures can have round/circular cross sections, rectangular cross-sections (e.g., for a projection of the aperture in a particular plane), open cross sections (where the aperture extends up to the distal end of the scoop, for example), and/or any other suitable cross-sectional geometries. In variants, a plurality of orifices/apertures can be arrayed (e.g., linear array, 2D array), patterned, and/or otherwise distributed. Alternatively, the orifices can be unitary (e.g., single orifice per scoop and/or per end effector), and/or otherwise arranged.

In variants, the grasp volume is preferably defined as the interior volume bounded by the grasp cavity(ies) in the grasp configuration, which can be deterministic for the geometry of the tool and/or can be deterministically controlled to pick a predefined volume/amount of an ingredient(s) based on the geometry. Additionally or alternatively, the system can be dynamically/adaptively controlled according to software defined grasp parameters to selectively grasp a variable amount of foodstuff grasped by the utensil and/or scoops thereof, such as by varying actuation parameters of the actuator 110 (e.g., actuation stroke force/distance, pneumatic actuation pressure, etc.), controlling the robotic actuation of the system (e.g., based on the orientation/trajectory of the robot arm, such as by jiggling or shaking the utensil using during a grasp; based on a grasp depth below a surface of the foodstuff; based on a lateral offset relative to a foodstuff target; based on a grasp offset from a surface of the foodstuff; etc.), utilizing perception/sensory feedback control (e.g., for non-volumetric grasping, such as mass-based grasping), and/or the amount of grasped foodstuff can be otherwise controlled/adjusted during grasping and/or insertion. For example, during grasping (e.g., which may shift/ agitate ingredients to facilitate grasping or grasping consistency) or insertion (e.g., which may aid in evacuation of ingredients from the grasp cavity), the actuator can be robotically manipulated to shake/jiggle the utensil and/or scoops with various amplitudes, displacements, and/or orientations (e.g., lateral displacement amplitude of less than 1 mm, 1 mm, 2 mm, 3 mm, 4 mm, 5 mm, 10 mm, greater than 10 mm, any open or closed range bounded by the aforementioned values, and/or any other suitable lateral displacement; robotic wrist rotation of: less than 5 degrees, 5 degrees, 10 degrees, 20 degrees, 30 degrees, 45 degrees, greater than 45 degrees, and/or any other suitable rotational displacement; jiggle/shake frequency of less than 0.3 Hz, 0.3 Hz, 0.5 Hz, 0.75 Hz, 1 Hz, 2 Hz, 4 Hz, 10 Hz, greater than 10 Hz, and/or any other suitable frequency; shaking/jiggling with any suitable motion characteristics, etc.).

However, the scoop can be otherwise transformable; and/or the utensil can include any other suitable set of scoops.

The set of ingressive elements 220 function to forcibly evacuate ingredients from the grasp cavity (e.g., clearing out ingredients adhering to the utensil) and/or occupy a portion of the grasp cavity (e.g., reducing the effective volume). The set of ingressive elements preferably transforms relative to the grasp cavity (and/or scoops bounding the grasp cavity) between the first and second configurations such that the ingressive element occupies a portion of the interior volume of the grasp cavity in the second (e.g., anti-grasp) configuration. Alternatively, the ingressive element can ingress into the cavity in the first configuration, between the first and second configurations, and/or in any other scoop configuration. The set of ingressive elements are preferably solid, but can alternatively be fluid (e.g., pressurized gas or liquid) and/or have any other state of matter. The set of ingressive elements can be substantially static (e.g., static, static relative to the actuator, displacement of less than 10% of a grasp cavity displacement, etc.) or may be transformable between the first and second configurations. For example, the set of ingressive elements can be coupled to the same actuation input as a scoop, a different actuation input than the scoop, may be coupled to the scoop (and/or integrated into a singular body). Accordingly, the ingressive elements may transform through the grasp cavity by transforming either and/or both of the scoop(s) and the ingressive element(s).

In the second configuration (and/or first configuration and all liminal states therebetween) set of ingressive elements are preferably offset from the body of the scoops and/or orifices thereof by a clearance distance (e.g., less than 0.25 millimeters, 0.25 millimeters, 0.5 millimeters, 1 millimeter, greater than 1 millimeters, any open or closed range bounded by the aforementioned values, etc.), which can minimize cyclic wear (e.g., for many thousands of cycles; occurring as a result of material contact under one or more instantaneous load cases and/or liminal states between the first and second configurations) during repeated and/or continuous operation. However, the ingressive element can alternatively establish contact with the body of the scoop(s) grasp surface and/or scrape against the scoops (e.g., where the material of the ingressive elements may be rubberized or deformable), or can be otherwise suitably configured.

The ingressive elements can enter the grasp cavity through orifices in the scoop(s), such as through a convex/ exterior side of a scoop (e.g., opposite grasping surface), through a thickness of the scoop, parallel to a central axis of a scoop (e.g., where the radial cross section of the scoop is substantially uniform along a length of the axis), and/or at any other suitable ends. The utensil can include a single ingressive element or multiple ingressive elements; ingressive elements can have one-to-one correspondence with the scoops, the utensil can include multiple ingressive elements per scoop (e.g., one-to-one correspondence per orifice in the scoops, etc.), and/or a single ingressive element may correspond to multiple scoops.

The ingressive elements can be in the form of fins, appendages, and/or protrusions, which extend from one or more material bodies of the end effector system. For example, ingressive elements may have a structure of fin array of a heat sink (e.g., with a geometry which may increases the convective/radiative heat transfer of the body, and/or which may have minimal to no impact on the system thermals) or resemble a heat sink fin array (e.g., while being constructed from a polymer). Additionally or alternatively, the ingressive elements can include a mechanical fin(s) with a cross-sectional geometry (e.g., along a primary axis of the fin, swept along a linear/arcuate path, etc.) which is substantially geometrically similar (e.g., scaled down from, offset by the clearance distance from) a cross-sectional geometry of a respective orifice(s), which the ingressive element may penetrate in one or more configurations. As a first example, fins may be arcuate, having a first and second radius about radial section of a hinge/revolute axis of the set of linkages based on proximal and distal end positions of apertures, such that the fins are configured pass through the orifices based on a relative rotation between the fins and scoops rotate about the revolute axis.

In one set of variants, the ingressive elements and the interior volume of the grasp cavities each define a respective swept volume based on a transformation of the end effector system between a grasp configuration and an anti-grasp configuration, wherein the respective swept volumes of the ingressive elements and the grasp cavities intersect.

In one set of variants, the ingressive elements occupy and/or intersect (in the anti-grasp configuration) a swept volume defined by a transformation of the scoops between a grasp configuration and an anti-grasp configuration.

In one set of variants, the ingressive elements transform along a swept volume (e.g., union of volumetric regions occupied by the ingressive elements at each liminal configuration) between the grasp and anti-grasp configurations, wherein the swept volume intersects a volume of the grasp cavity in the anti-grasp configuration.

In one set of variants, the interior of the grasp cavity comprises a grasp surface 204 which is configured to contact ingredients within the grasp cavity, wherein the grasp surface defines a reference surface, defining a maximal extent of the ingredients in the grasp configuration (e.g., where ingredients do not pass through the orifices; by substantially closing out orifices relative to the grasp surface, such as by fitting a planar/arcuate surface to the orifice based on the scoop geometry, etc.; wherein the reference surface is a closed 3D solid), wherein the ingressive elements ingress the reference surface in the anti-grasp configuration.

In one set of variants, each ingressive element defines an ingressive surface 206 (e.g., at a distal end of the fin/appendage) which is configured to contact foodstuff ingredients in one or more configurations of the system, wherein the ingressive surfaces ingress the grasp cavity in the anti-grasp configuration.

In one set of variants, each ingressive element of the set comprises a fin with a cross-sectional geometry which is strictly smaller than the geometry of a respective aperture (e.g., wherein the fin is configured to ingress the respective aperture in the anti-grasp configuration).

Ingressive elements can ingress a portion of the scoop and/or grasp volume or an entirety of the scoop interior (e.g., with less than a predetermined clearance of less than a predetermined dimension, such as a minimum foodstuff particulate dimension, to all portions of the scoop). For example, the scoops can include a volumetric region which is not penetrated by the ingressive elements (e.g., non-ingress region of the interior), instead relying on gravity and/or other cleared ingredients to evacuate foodstuffs (e.g., where the ingressive elements clear foodstuff from a portion of grasp surfaces which have surface normal vectors oriented above horizontal and/or define an angle less than a predetermined threshold relative to horizontal, such as less than 10, 20, 30, 45, 70 degrees below horizontal, to which foodstuff particulates may more readily adhere). Conversely, in a first example, ingress element dimensions and/or orifice dimensions can be increased so that the ingressive elements ingress a proximal portion of the grasp cavity (e.g., upper portion, portion adjacent to a hinge, etc.). However, the scoops and/or ingressive elements can be otherwise shaped to provide any suitable partial or complete ingress of the ingressive elements in the anti-grasp configuration.

However, the utensil can include any other suitable set of scoops.

The set of mechanical linkages 230 to transform the actuation input 112 from the actuator (e.g., as transferred through the utensil mating connector) into a relative transformation of the grasp cavity. Additionally or alternatively, the set of mechanical linkages functions to transition the utensil between a first configuration (e.g., grasp configuration) and a second configuration (e.g., anti-grasp configuration; ingressive configuration; open configuration, etc.).

The mechanical linkages preferably include revolute (a.k.a. hinged) joints, but can additionally or alternatively include prismatic (a.k.a. sliding) joints, spherical joints, cylindrical joints, universal joints, planar joints, and/or any other suitable joints. The mechanical linkages can be coupled and/or formed into a unitary kinematic chain, multiple kinematic chains, open kinematic chains, closed kinematic chains, and/or arranged in any other suitable configuration(s). The set of mechanical linkages can include one or more: lever mechanism (e.g., hinged linkage), scissor linkage, 3-bar linkage, 4-bar linkage (e.g., parallelogram linkage), 5-bar linkage, 6-bar linkage, planar linkage, spatial linkage, Scott Russell linkage, crank-rocker linkage, slidercrank, drag-link mechanism, and/or any other suitable linkage(s). The set(s) of mechanical linkages is preferably substantially symmetric (e.g., in a projected plane, mirror symmetry, etc.), but can alternatively be asymmetric. In a first example, a single linkage can be symmetrically connected to opposing scoops (e.g., hinged at a central pivot) and generate symmetric transformations. In a second example, a pair of joints constraining a distal element of a scissor linkage can be a revolute joint and a pin-in-slot joint (e.g., which may be kinematically modeled as a revolute joint in combination with a sliding joint), respectively. However, any suitable types and/or arrangements of mechanical linkages can be used. However, the utensil can include any other suitable set of mechanical linkages.

In one set of variants, the mechanical linkages can define a first 2D coupler curve associated with a point on the body of the ingressive elements and a second 2D coupler curve associated with a point on the body of a scoop, wherein the first and second coupler curves intersect in a projected 2D plane (e.g., side view plane).

The mechanical linkages can be actuated linearly (e.g., extending one element/bar of the linkage), rotationally, and/or otherwise actuated via any suitable actuation input[s] 112).

In variants, revolute joints between mechanical linkages can include any suitable hardware/fasteners. In a first example, revolute joints can include shoulder screws or other threaded fasteners. In a second example, revolute joints can include grooved pins with retention clips (e.g., c-clips) and wave lock washers.

The utensil can optionally include a shaping surface 208 which functions to shape an aggregate pose of ingredients upon placement (e.g., when depressed against the upper surface of the ingredients) or picking. The shaping surface can be integrated into or be the same as an ingressive element or be a separate body. The shaping surface can be flat/planar, concave, convex, saddle-shaped (e.g., form of an anticlinal fold), and/or have any other suitable geometry. In a first example, the shaping surface can be arranged on a (downward facing) surface of the ingressive element(s), opposite the actuator. In a second example, the shaping surface can be a proximal portion of the grasp surface (e.g., closest to the actuator). In variants, the shaping surface is may be configured to compress and/or aggregate ingredients based on a transition to an anti-grasp configuration, or based on a transformation of a robotic assembly system (e.g., transforming the entire end effector system towards the ingredients in an anti-grasp configuration). However, the utensil can alternatively exclude a shaping surface, and/or can be otherwise suitably configured.

In variants, the body geometry(ies) of the extension elements, scoops, mechanical linkage elements, ingressive elements, and/or any other suitable utensil elements can be shaped to reduce/eliminate pinch points. For example, various adjacent moving components can include material closeouts which provide less than a threshold finger clearance (e.g., less than 6 millimeter spacing) between adjacent bodies which transform relative to one another. For instance, in variants where each scoop of the is integrated with a linkage element and at least one ingressive element as a unitary body, a central portion of the unitary body can include a uniform radius (and thickness) about an axis of the revolute joint. Accordingly, when two such bodies transform adjacent to one another (rotating about the revolute joint), the resulting transformation does not result in a gap larger than 6 millimeters. Additionally, in variants which include extension elements, the extension elements can be angled between a base and a distal end (e.g., rather than L-shaped), which may result in a larger clearance (e.g., for a hand/wrist) and a resulting V-shape between a pair of extension elements (e.g., which may push any foreign body caught in between them, such as a hand/wrist, upward during an actuation stroke, as opposed to instantaneously shearing the foreign body). However, any other elements of the system can include any other suitable bulges/protuberances which may close out finger gaps and/or otherwise reduce/eliminate pinch points. Additionally or alternatively, the utensil can optionally include or be used in conjunction with a sheath or other surrounding enclosure, which substantially encloses the utensil and may reduce/eliminate opportunities for finger/hand ingress into the set of mechanical linkages and/or base end of the scoops (e.g., which may further reduce/eliminate pinch points).

In one set of variants, a robotic end effector system for aggregate manipulation of foodstuff can include: an actuator configured to mount to a distal end of a robotic arm; and a foodstuff utensil mounted to the actuator, which includes: a plurality of scoops, each including a respective grasp cavity and a defining set of apertures; a set of mechanical linkages coupling the plurality of scoops to the actuator and configured to transition the plurality of scoops between a grasp configuration and an anti-grasp configuration based on a mechanical actuation input from the actuator, wherein, in the grasp configuration, the plurality of scoops cooperatively defines a grasp volume within an interior of the respective grasp cavities of the plurality of scoops; and a set of ingressive elements, each ingressive element of the set aligned with a respective aperture, wherein, in the grasp configuration, each ingressive element is outside of the grasp volume, wherein, in the anti-grasp configuration, each of the ingressive elements ingress into the interior of the respective grasp cavity through the aperture.

In a second set of variants, nonexclusive with the first set, a foodstuff utensil which is configured to mount to an actuator of a robot for aggregate manipulation of foodstuff can include: a set of utensil mating connectors; a set of scoops, each including a grasp cavity and a defining set of apertures; a set of ingressive elements, each ingressive element aligned with a respective aperture of a corresponding scoop; a set of mechanical linkages coupling the set of scoops to the set of utensil mating connectors, wherein the set of mechanical linkages is configured to transform the set of scoops between a first and second configuration based on an actuation of the set of utensil mating connectors, wherein, in the first configuration, each ingressive element is outside of an interior grasp volume of each grasp cavity, wherein, in the second configuration, each of the ingressive elements ingress the corresponding scoop through the respective aperture.

However, the end effector system can include any other suitable utensil(s).

5. Operation

Variants of the multi-deposit system can operate in conjunction with any one or more of the method(s) as described in U.S. application Ser. No. 18/075,961, filed 6 Dec. 2022, titled "SYSTEM AND/OR METHOD OF COOPERATIVE DYNAMIC INSERTION SCHEDULING OF INDEPENDENT AGENTS," U.S. application Ser. No. 18/443,178, filed 15 Feb. 2024, titled "SYSTEM AND/OR METHOD FOR ROBOTIC FOODSTUFF ASSEMBLY," and/or U.S. application Ser. No. 18/499,092, filed 31 Oct. 2023, titled "SYSTEM AND/OR METHOD FOR CONVEYOR MOTION ESTIMATION," and/or system otherwise facilitate foodstuff deposits by any other suitable method(s).

Figure 10A:
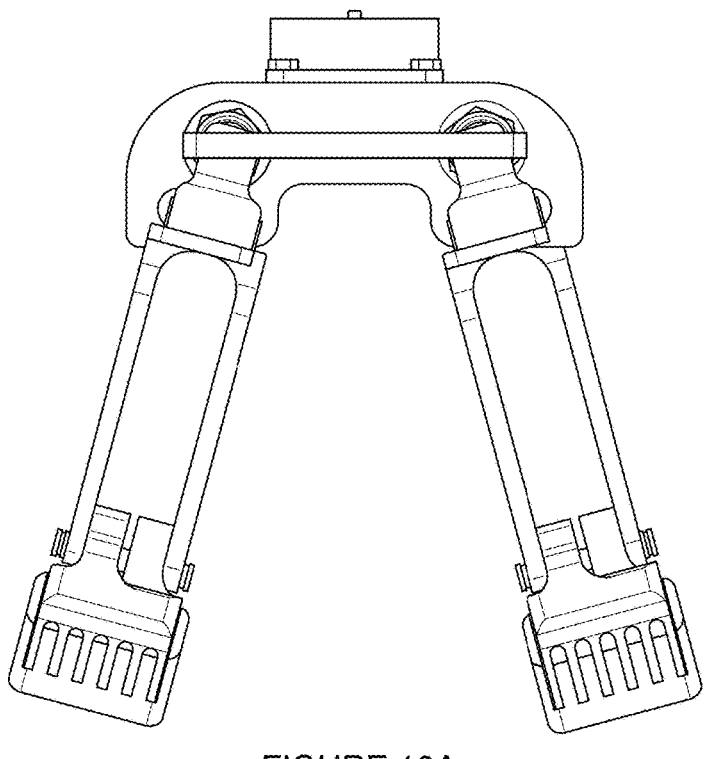
FIGS. 10A-10B are side views of a first and second configuration of a variant of a multi-deposit end effector system.
Figure 10B:
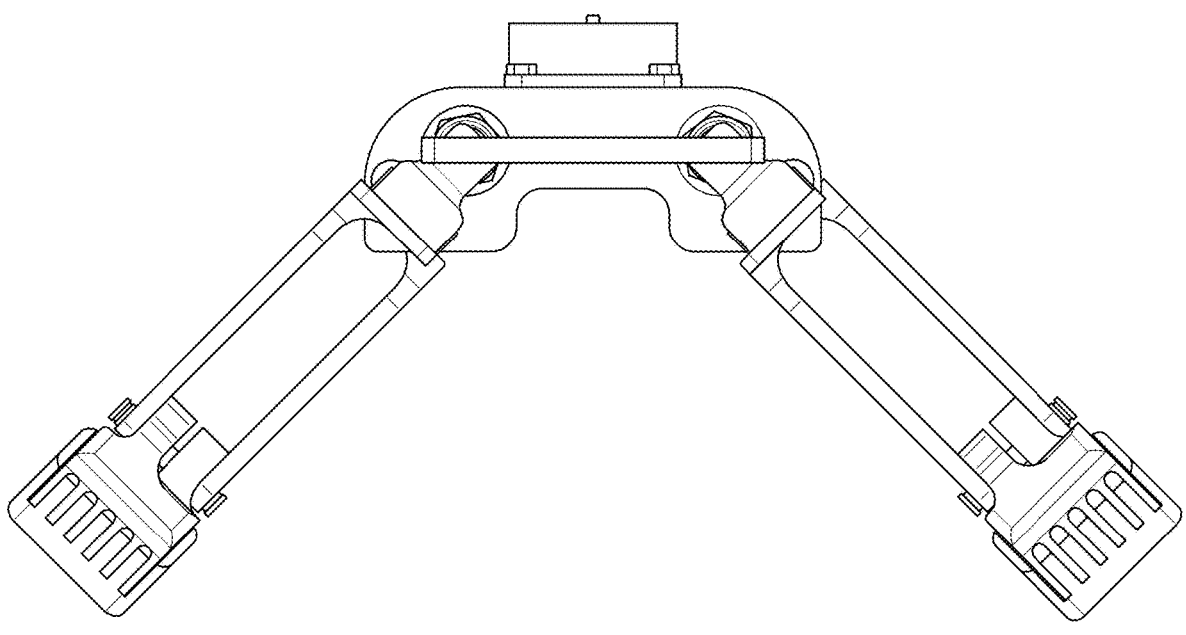

In variants, the system can facilitate multiple, simultaneous picks (i.e., concurrent, dependent picks with multiple utensils; concurrent, independent picks with multiple utensils). Additionally or alternatively, the system can facilitate multiple, distinct pick operations between deposition cycles (e.g., independent picks with each utensil in FIGS. 10A-10B, with a rotation to reorient the utensil[s] between picks) and/or at distinct pick targets. Picks and/or pick target selection can be based on the collective footprint of the set of utensils (e.g., bulk foodstuff height across the entire footprint). For example, volumetric utensils can be configured to grasp a target portion (e.g., mass, volume, etc.) of foodstuff based on the volume of the grasp cavity, largely unrelated to the surface topology of the foodstuff, across a range of depths which yield a larger swept volume of foodstuff than the target portion. Accordingly, the pick target can be selected for the set of utensils as the highest pick target which satisfies the swept volume constraints across the collective footprint of the set of utensils and/or for each utensil individually. Additionally or alternatively, the pick targets can be selected independently for each utensil (i.e., for independent picks), such as using a cost function optimization, heuristics, decision tree, neural network, and/or any other suitable technique(s), such as those described in the aforementioned method(s). However, the system can otherwise facilitate foodstuff picking.

Similarly, the system can be configured to facilitate simultaneous deposits/insertions (e.g., at distinct containers, where the separation between utensils is adjusted based on the container separation). Additionally or alternatively, variants can facilitate independent, asynchronous foodstuff deposition with each utensil, which may be particularly advantageous where the separation between container may not be tightly controlled (e.g., an unindexed conveyor; utensils may not need to be constrained based on container spacing). In particular, variants can facilitate independent insertion into multiple (e.g., simultaneously-tracked) containers on a conveyor, such as adjacent containers in a single lane. At high throughput and/or conveyor speeds (e.g., relative to cycle time and perception area), it may additionally be advantageous to observe and track a target container for each utensil (e.g., three containers) prior to traversal and/or initial ingredient deposition, since the system and/or utensils may occlude perception during the insertion operation(s). Alternatively, variants can facilitate insertion into containers offset along a width of the conveyor (i.e., adjacent containers in different lanes). However, trajectory planning for insertion operation(s) can additionally or alternatively be independent for each utensil/insertion, and/or trajectories can be (inter-) dependent, pre-planned, determined in series (e.g., asynchronously), determined contemporaneously with a prior operation, and/or the system can otherwise facilitate insertion and insertion planning with any other suitable timing.

In a first variant, the multi-deposit end effector system can perform independent picks and independent insertions with each utensil.

In a second variant, the multi-deposit end effector system can perform dependent picks with the plurality of utensils (e.g., synchronous, single operation, fixed spacing, etc.) and independent insertions with each utensil.

In a third variant, the multi-deposit end effector system can perform dependent picks with the plurality of utensils (e.g., synchronous, single operation, fixed spacing, etc.) and dependent insertions with each utensil (e.g., fixed container spacing; examples are shown in FIGS. 13, 14A-14C, 15A-15B).

In a fourth variant, the multi-deposit end effector system can perform independent picks with each of the plurality of utensils (e.g., based on foodstuff pose, etc.) and dependent insertions with each utensil (e.g., based on fixed container spacing, etc.).

However, the system can otherwise facilitate multi-deposit operation(s).

Variants of the system can perform multi-picks and/or deposits. Variants can use a single actuator (e.g., examples are shown in FIGS. 11 and 12) and/or multiple actuators (e.g., examples are shown in FIGS. 5, 6, 7, 8, and 9).

In a first set of variants, two or more utensils in parallel can be used to pick and place simultaneously. Such variants could operate in both single and multi-pick modes. Each additional utensil added would increase throughput significantly (e.g., by 100%). The weight may only be slightly heavier per utensil than a single utensil end-effector stack. Such variants could solve a specific case where bowl spacing distance is well controlled (e.g., potentially serving up to ~70 bowls per minute with a single system). Variants could operate with two separate kinds of deposits with this system.

In a second set of variants, a cam (and/or cam-follower pair) can be used to trigger the utensil opening/closing on one stroke (e.g., with a spring loaded trigger or other mechanism to trigger the reverse action). Such variants could allow independent measurements of pick weights (e.g., as opposed to a collective pick weight measurement) and/or could optionally allow separate deposits.

In a third set of variants, multiple utensils could be articulated with a single position controlled actuator (e.g., rotary or linear). For instance, the utensil could rotate with multiple chambers or could include a more mechanical system that opens chambers/utensils in series along the actuation stroke.

In a fourth set of variants, each utensil can be actuated by its own actuator. Such variants could be configured to pick simultaneously or one at a time. Similarly, variants could facilitate separate deposits or simultaneous deposits. Such variants could allow separate pick weight measurements.

In variants, utensils can be actuated with Bowden cables instead of electric or pneumatic actuators, which may advantageously reduce weight.

However, variants can be otherwise configured.

7. Planning and Control

7.1 System

Figure 16:
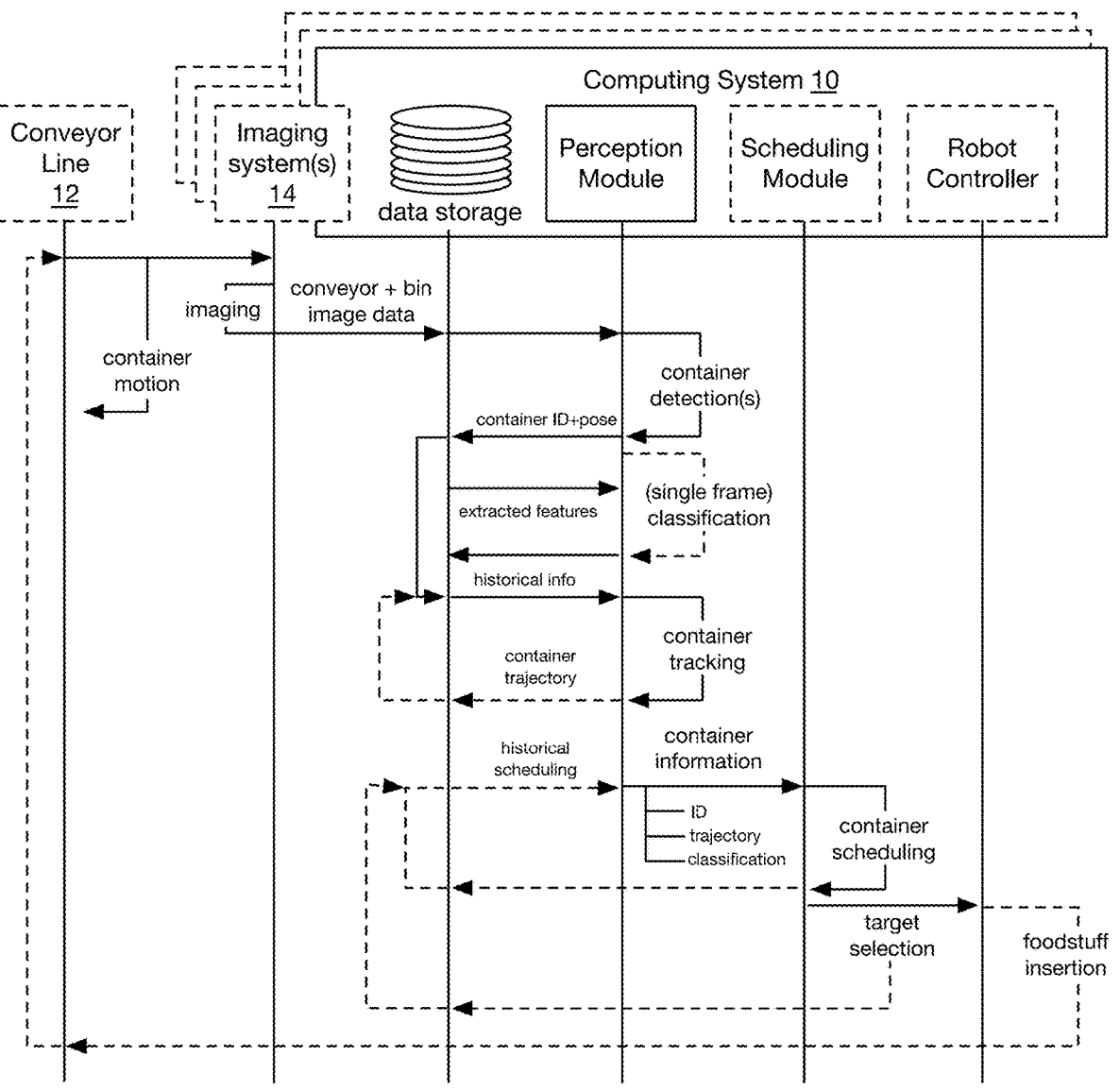
FIG. 16 is a flowchart diagram representation of a variant of the method and/or system.
Figure 17:
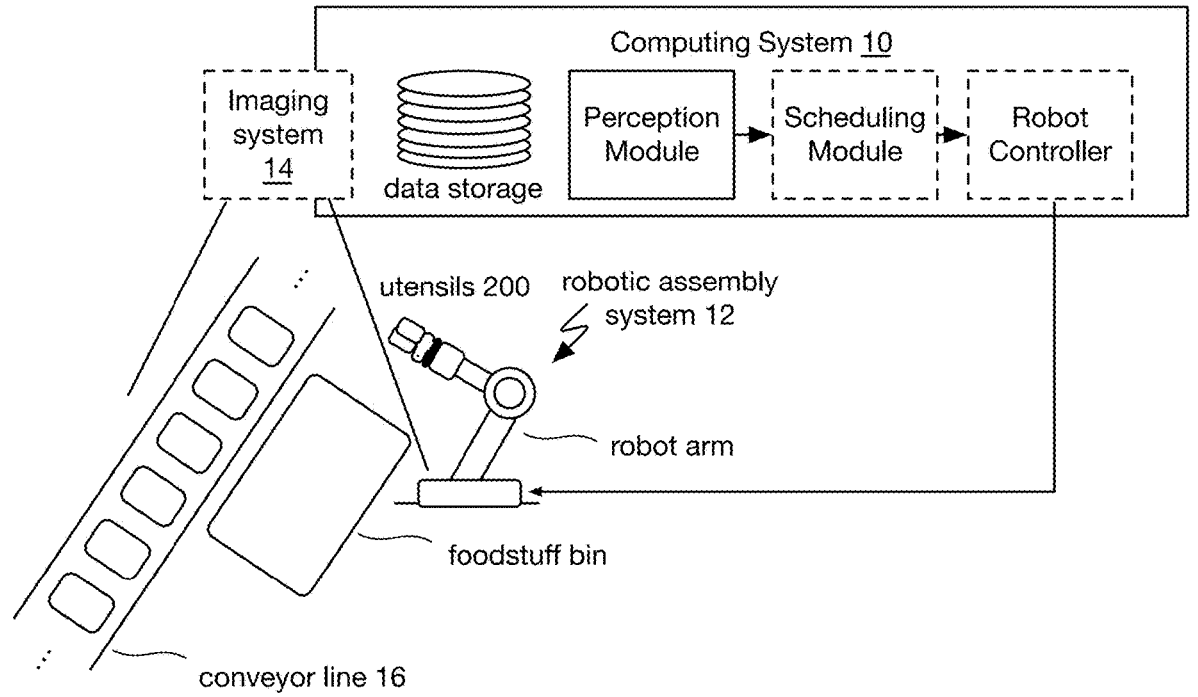
FIG. 17 is a schematic representation of a variant of the system.

A planning and control system, an example of which is shown in FIG. 16, can include and/or operate in conjunction with a computing system 10, a robot assembly system 12, an imaging system 14, and an optional conveyor line 16. The computing system 10 can include: a perception module, an optional scheduling module, and an optional robot controller, and/or any other suitable computing module/elements. However, the system can additionally or alternatively include any other suitable set of components. The system functions to facilitate execution of method S100. Additionally or alternatively, the system can function to facilitate runtime classifications of bowls along an assembly line to facilitate robotic ingredient insertion, such as with the system and/or method(s) described in U.S. application Ser. No. 17/881,475, filed 4 Aug. 2022, which is incorporated herein in its entirety by this reference. An example integration is shown in FIG. 16.

In some variants, the system can optionally include or be used with a robotic assembly system 12, such as a robotic pick and place system, gantry-style dispensing system, multi-axis robotic arm, and/or other robotic assembly system. In one variant, the system can include or be used in conjunction with the robotic foodstuff assembly system as described in U.S. application Ser. No. 17/881,475, filed 4 Aug. 2022, which is incorporated herein in its entirety by this reference.

The system can optionally include or be used in conjunction with an industrial conveyor line 16 or deployed in a high-throughput assembly application (e.g., airline food catering prep, etc.; continuously moving line; where a container throughput rate exceeds an insertion throughput rate of a robotic assembly module by a factor of: 1.5, 2, 3, 4, greater than 4, any range bounded by the aforementioned values, and/or any other suitable line speed, etc.), such as in place of a human line worker. In a specific example, the system and/or workspace thereof can be downstream of a human assembly workspace along the conveyor line. In a second example, a cyclic insertion of the foodstuff ingredient by the system and/or method can define an (ingredient) insertion rate, wherein a container throughput rate of the conveyor line is greater than the insertion rate (e.g., between 100% and 200% of the insertion rate, exactly 200% of the insertion rate, greater than 200% of the insertion rate, etc.). However, the system can alternatively be deployed in any suitable robotic assembly settings.

In variants, multiple independent (e.g., modular) instances of the system and/or method can cooperatively operate and/or coordinate without requiring cross communication (e.g., between modules), cross calibration (e.g., calibrate the relative arrangement and/or offset between leading/following modules relative to the conveyor), and/or centralized control (e.g., at a central compute node coordinating between modules). In a specific example, a plurality of robotic assembly modules arranged along a single conveyor line may operate in absence of communication with each other and/or a central controller during planning and/or ingredient insertion. Additionally or alternatively, modular instances can communicate object tracking information (e.g., detections+object tracks) and/or object classifications (e.g., 'completed' bowls), such as to facilitate downstream object classifications/planning based on a priori control and/or tracking. In a second example, each robotic assembly module can be controlled independently of a conveyor line and/or while communicatively decoupled from the conveyor line. For instance, in absence of communication with a conveyor line controller, the perception module can detect and/or track containers on the conveyor line and respond accordingly (e.g., dynamically adjusting current/future scheduling, planning, and control based on the motion of the conveyor; based on the container state[s]). As an example, two robots arranged in series along a conveyor line may each insert a particular ingredient (e.g., rice) into containers moving along the conveyor line, with each robot inserting ingredients into a fraction of the containers. The first robot may place ingredients into (a.k.a., 'serve') about half the containers (e.g., alternating insertions; every other container; at an irregular cadence), more than half the containers (e.g., at an irregular cadence), or some other arbitrary selection(s) of containers. To cooperate with the first robot and avoid inserting into a bowl that has already been served, the second robot (and/or both robots) may classify the state of each container moving along the line as 'served' or 'unserved,' and perform insertion planning based on the container state classifications (e.g., based on a priori object tracks/classifications from the first robot; in absence of a priori data).

Additionally or alternatively, variants can be directly or indirectly communicatively coupled with a conveyor line controller to dynamically coordinate ingredient insertion (e.g., responsive to conveyor dwell in an indexed, stop-and-go conveyor) and/or conveyor motion (e.g., to control throughput and/or prevent missed bowls). For example, the modules can be configured to read the conveyor speed, set the conveyor speed, and/or dynamically control the conveyor speed as may be advantageous in various contexts. As an example, control loop-closure (e.g., for stop-and-go conveyors) can reduce dwell time, thus increasing net throughput. Additionally or alternatively, in some variants the computing system can be communicatively coupled to a conveyor controller such that the system can directly read and/or control the speed setpoint of a continuous conveyor. For example, controlling the speed setpoint at a downstream, following robot can may reduce and/or completely eliminate missed bowls (e.g., while increasing net throughput).

The imaging system 14 functions to capture images of objects (e.g., food containers) within a workspace of the system, such as a workspace along a conveyor line. Additionally or alternatively, the imaging system can function to provide imaging data to the object detector in accordance with Block S110 of the method. Additionally or alternatively, the imaging system can provide images which can be (auto-) labeled and used for training of the classification system in accordance with method Block S200. The imaging system can include: conveyor line cameras (e.g., integrated into the conveyor line and/or arranged adjacent to the conveyor line; oriented toward bowls and/or a workspace along the conveyor line). The imaging system preferably includes 2D RGB cameras, depth imaging cameras, stereo camera pairs, CCD cameras, CMOS cameras, multispectral cameras, time-of-flight sensors (e.g., Lidar scanner, etc.), range imaging sensors (e.g., stereo triangulation, sheet of light triangulation, structured light scanner, time-of-flight, interferometry, etc.), and/or any other suitable sensors. In variants, the imaging system can collect sensor data which can include: RGB images (e.g., 2D), depth images (e.g., pixel aligned with the RGB, wherein the RGB image and the depth image can be captured by the same or different sensor sets), 3D imaging data, 3D representations (e.g., point cloud, 3D model, etc.). In variants, the imaging system can determine a first set of 3D sensor data—which can be used for bowl detection during S120—and a second set of 2D sensor data (e.g., RGB data and/or RGB-d data)—which can be classified (e.g., in accordance with S130) and used to facilitate actions and/or robotic insertion in accordance with Block S140. Additionally or alternatively, 2D sensor data generated by the imaging system can be used for object classification and insertion planning during runtime operation.

Within the (each) foodstuff assembly module, imaging sensors are preferably calibrated within a common coordinate frame (i.e., sensor coordinate frame calibrated to a relative arrangement of the conveyor line and the robotic assembly module) in a fixed/predetermined arrangement relative to a (joint) coordinate frame of the respective robot assembly module, but can be otherwise suitably configured. For example, imaging sensors can be registered to a particular machine configuration and/or environmental setting (e.g., live/in-situ registration), such as by the process(es) described in U.S. application Ser. No. 17/881,475, filed 4 Aug. 2022, which is incorporated herein in its entirety by this reference. Additionally or alternatively, imaging sensors can be globally calibrated (e.g., across modules, where the relationship is predetermined in a global coordinate frame) and/or can be otherwise configured.

However, the system can alternatively include or be used in conjunction with any other suitable imaging system(s); or the system can altogether exclude an imaging system.

The computing system 10 functions to facilitate bowl classification and/or ingredient insertion based on bowl classifications (i.e., into 'incomplete', bowls which have not been served the ingredient within the foodstuff bin). Additionally or alternatively, the computing system can function to perform various method elements and/or subprocesses of method S100. The computing system and/or processing modules thereof can be centralized, distributed, local (e.g., onboard a robotic assembly module; edge computing; etc.), remote (e.g., include remote processors offboard a robotic assembly system 12 and/or cloud processing elements), and/or include any other suitable processing elements/modules.

The computing system and/or perception module thereof can include and/or execute a set of models, which functions to facilitate method S100. The set of models can include an object detector (a.k.a., bowl detector), a similarity model, and/or any other suitable model(s). The set of models can optionally include a context-specific classification model, a pattern-based classification model, a context-specific subnetwork, a decision layer, and/or any other suitable elements. Additionally or alternatively, the set of models can include or be used in conjunction with a coordinated tracking module and/or a model(s)/elements thereof (e.g., Simultaneous Localization and Mapping [SLAM] algorithm, Extended Kalman filter [EKF], covariance intersection algorithm, etc.; classical algorithms, etc.).

The models can include classical or traditional algorithmic approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, SNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naive Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, filtering methods (e.g., particle filters, Kalman filters, EKF, etc.), covariance intersection methods, and/or any other suitable models, elements, and/or algorithmic elements. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), back-propagation, and/or otherwise generated. The models can be learned or trained on: labeled data (e.g., data labeled with the target label; auto-labeled training data, such as the context-specific training dataset), unlabeled data, positive training sets (e.g., a set of data with true positive labels), negative training sets (e.g., a set of data with true negative labels), and/or any other suitable set(s) of data.

Any model can optionally be validated, verified, reinforced, calibrated, or otherwise updated based on newly received, up-to-date measurements; past measurements recorded during the operating session; historic measurements recorded during past operating sessions; auto-labeled measurements; or be updated based on any other suitable data. For example, the model(s) and/or sub-elements thereof can be trained and/or updated using auto-labeled training dataset(s), heuristically labeled training datasets, manually labeled data, and/or using any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

The object detector (a.k.a., bowl detector) functions to detect bowls within the workspace of the conveyor. Additionally or alternatively, the object detector functions to execute Block S120. The object detector is preferably a 3D object detector which receives 3D representations from the imaging system as an input and generates a pose estimate as an output. Additionally or alternatively, the object detector can utilize 2D images (e.g., RGB), 2.5D images (e.g., RGB-depth images), greyscale images, point clouds, and/or any other suitable imaging data inputs. The object detector is preferably generalized/global to detect and/or generate pose estimates for bowls of arbitrary shapes/sizes (e.g., based on the object geometry). Additionally, the object detector preferably can output a segmented image region (e.g., bounding box) to be used for (comparative) bowl classification by a similarity model.

In variants, the object detector can be a neural network (NN) object detector which can include a convolutional neural network [CNN] based object detector (e.g., ResNET-18 backbone), cascade neural network, ensemble networks/methods, YOLO network, single shot multiBox detector (SSD), single-shot refinement neural network, and/or any other NN-based object detector. Additionally or alternatively, the object detector can be a non-neural network based object detector (e.g., feature and/or geometry based detector) and/or any other suitable object detector.

In variants, the object detector is preferably pretrained and/or predetermined (e.g., prior to execution of S100), but can additionally or alternatively be updated (e.g., via wireless updates from a remote or cloud processor, based on subsequent data collection, etc.) with any suitable frequency/timing. The object detector is preferably generalized (e.g., not specific to a particular assembly context, trained based on a variety of assembly contexts, etc.), but can be otherwise implemented.

Additionally, the set of models can include and/or operate in conjunction with the bowl detection and/or classification models as described in U.S. application Ser. No. 18/379,127, filed 11 Oct. 2023, which is incorporated herein in its entirety by this reference. However, the system can include or be used with any other suitable set of model(s).

The perception module can include a context-specific classifier which functions to classify containers (and/or a binary container state) relative to a machine context. For example, the machine context can be predetermined, received via an HMI, automatically received from an external system (e.g., cloud system, upstream robotic assembly module, assembly module communicatively connected via a local/wireless network, etc.), and/or otherwise determined. The context-specific classifier can classify containers based on a predetermined set of rules/heuristics, specified for a machine context. As an example, containers can be classified based on conveyor coloring/patterns (e.g., colored stripes; with each container in a particular stripe receiving a predetermined classification based on the context; 4 modules in series could each target a respective stripe color[s], with the belt configured with any suitable number/width of stripes). As a second example, containers can be classified based on row alignment and/or lateral arrangement (e.g., each container within a particular row may be labelled with a predetermined classification; where rows may be fully or partially offset along the conveyor width; based on relative displacement along the width of the conveyor). For instance, the system can filter out (such as by labelling with a 'complete' classification or otherwise) containers in a predetermined row, lane, and/or arrangement (e.g., within a colored stripe; offset by at least a predetermined threshold in Y along conveyor width; one predetermined row of bowls can be targeted for a multi-row conveyor line, etc.), which are not specified as targets for the machine context. However, the perception module can additionally or alternatively include any other suitable context-specific classifier and/or operate without a context-specific classifier (e.g., infer context from historical patterns, such as with a pattern-based classification model, and/or a prior data).

In variants, the perception module can optionally include a coordinated tracking module which functions to determine a classification(s) based on a priori object tracks (e.g., including a classification), such as from an upstream system of the conveyor line. For example, the coordinated tracking module can use a SLAM algorithm and/or other techniques to map the object detections in a current frame (and/or identified object tracks within the current frame) to prior object detections/tracks received from an upstream system to determine classifications for each object/bowl (e.g., based on upstream classifications and/or insertions). For instance, an a priori classification of a container which is completed/filled by an upstream system along the conveyor line can be used to classify the container at the (downstream) system where the container is identified and mapped into the current image frame with perception data from both systems (e.g., comparison of detections to map of a priori tracks from an upstream system, such as using Bayes filtering algorithms, Kalman filters, optimization-based mapping, such as graph-based SLAM or PTAM; using perception data and/or derived object detections; etc.). However, the perception module can additionally or alternatively include any other suitable coordinated tracking module and/or operate without a coordinated tracking module (e.g., where each assembly system/module is fully independent and/or operates without cross-communication, etc.).

For example, object detections can be mapped/indexed against a priori object data/tracks from an upstream module, such as indexing bowls using the bowl count and/or position (e.g., in direction of motion) as a reference. Additionally or alternatively, a priori data can be used to index against any suitable set of derived references (e.g., bowl pose parameters, spacing of bowls, lateral position of bowls, ingredient height, bounding boxes, bowl rotation, bowl vertical position, bowl orientation, etc.).

As a second example, the trajectory of indexed and classified a priori bowl detections (and/or belt features) can be mapped into a coordinate frame of a (downstream) module based on a calibrated or inferred spacing between modules along the belt, which can be used to classify detected containers at the (downstream) module.

Coordinated modules can communicate: container counts (e.g., counts can be compared and reset in the case of drift; monitoring the speed of the tracks can allow for the timing/distance offset between the modules); perceived gap between bowls (e.g., indexed bowls and/or gaps; gaps can be used as a reference points both to compare counts and/or for module spacing; a large difference in the spacing may indicate the bowls were disrupted and may trigger a reset in the count or reliance on a separate classification approach); derived information about the bowl (e.g., which may add additional reference points, such as y position, rotation angle, etc.); module spacing (e.g., directly calibrated via a routine that sends one bowl down the line before running; inferred/calculated online based on coordinated mapping/tracking; etc.); relative position/order (e.g., predetermined; received via a user input at an HMI; derived based on SLAM or other method of cross-coordination which minimizes error between bowl position and a priori upstream tracks); and/or any other suitable data.

As an example, the HMI at one module can pair and/or coordinate the module relative to one or more proximal modules along a conveyor line, such as by manually providing the module order relative to the conveyor line and enabling cross-communications of the paired modules. Additionally or alternatively, the order can be automatically determined/derived for paired modules, and/or can be otherwise determined; and/or cross-coordination of modules can be otherwise enabled (e.g., centralized computing system; master-slave or lead-following of HMIs and/or computing systems, etc.).

For example, upon pairing (and/or communicatively coupling) two modules in a leading and/or following arrangement via the HMI, the downstream 'following' module can calibrate an offset distance between first and second robot workspaces based on a relative spacing between the plurality of containers. For example, the offset distance is determined by Simultaneous Localization and Mapping (SLAM) along the conveyor (e.g., wherein the offset distance is less than twice the dimension of the first robot workspace along the length of the conveyor line). Alternatively, the distance can be manually provided, estimated using secondary sensors, and/or can be otherwise determined. Additionally or alternatively, the offset distance can be updated periodically recalibrated and/or updated responsive to tracking errors, SLAM deviations, and/or any other suitable events/determinations.

However, the system can include any other suitable computing modules and/or altogether exclude one or more computing modules in some configurations/implementations (e.g., training, runtime, etc.)

Additionally or alternatively, robot modules can operate independently and/or without cross-communication, such as via the system(s) and/or method(s) as described in U.S. application Ser. No. 19/047,374, filed 6 Feb. 2025, which is incorporated herein in its entirety by this reference.

However, the system can include any other suitable components.

7.2 Method

Figure 18:
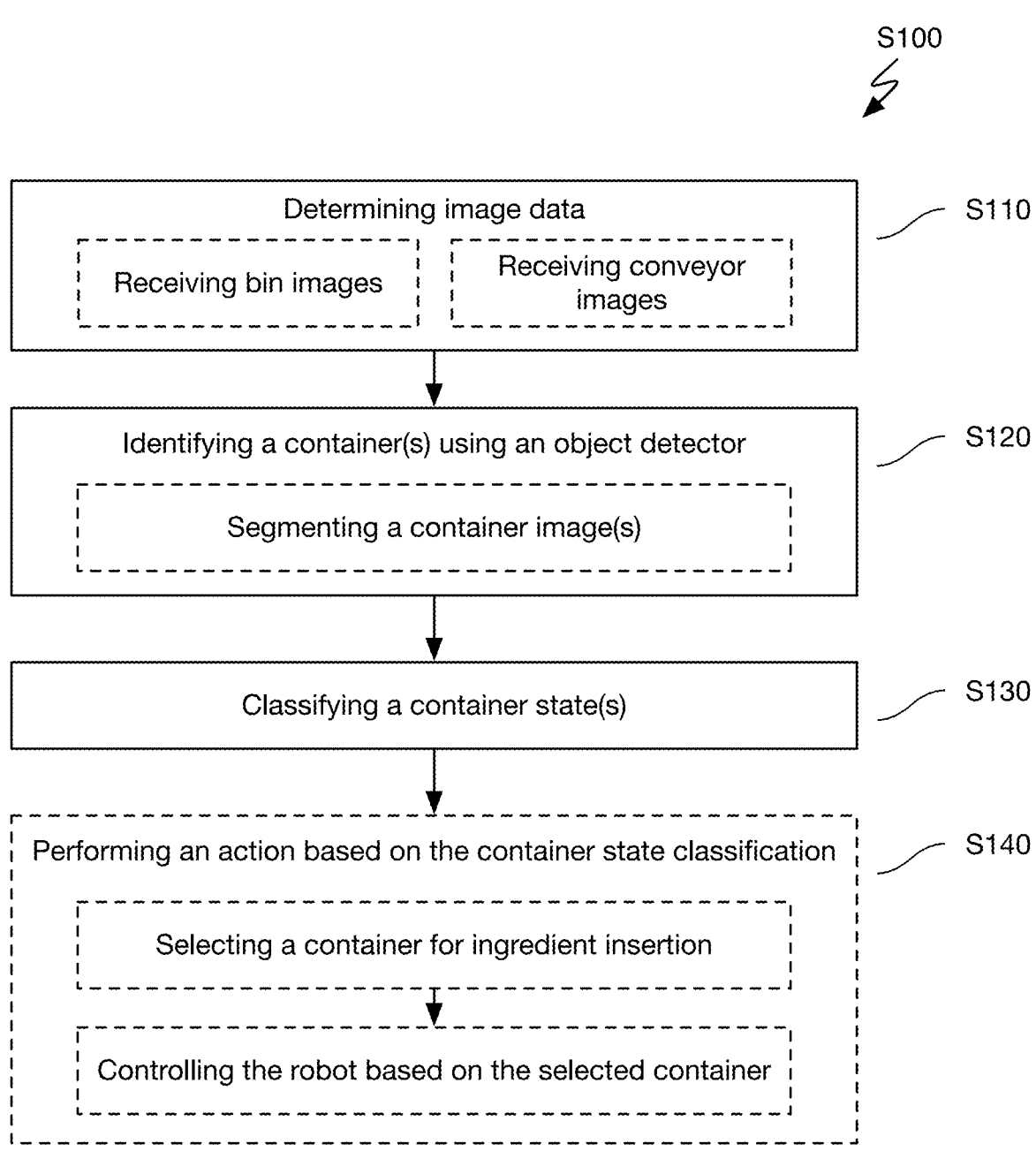
FIG. 18 is a flowchart diagram representation of a variant of the method.

The method S100, an example of which is shown in FIG. 18, can include: determining image data S110; identifying a container using an object detector S120; and classifying a container state S130. The method can optionally include performing an action based on the container state classification S140. However, the method S100 can additionally or alternatively include any other suitable elements. The method functions to detect and classify the state of bowls (i.e., complete/incomplete) to facilitate ingredient insertion into (unserved, 'incomplete') bowls along an assembly line. Additionally or alternatively, the method can function to facilitate operation in conjunction with the any of the systems and/or method elements as described in U.S. application Ser. No. 17/881,475, filed 4 Aug. 2022, titled "SYSTEM AND/OR METHOD FOR ROBOTIC FOODSTUFF ASSEMBLY", U.S. application Ser. No. 18/075,961, filed 6 Dec. 2022, titled "SYSTEM AND/OR METHOD OF COOPERATIVE DYNAMIC INSERTION SCHEDULING OF INDEPENDENT AGENTS," U.S. application Ser. No. 18/379,127, filed 11 Oct. 2023, titled, "OBJECT CLASSIFICATION SYSTEM AND/OR METHODS," and/or U.S. application Ser. No. 18/499,092, filed 31 Oct. 2023, titled "SYSTEM AND/OR METHOD FOR CONVEYOR MOTION ESTIMATION," each of which is incorporated herein in its entirety by this reference.

The method and/or sub-elements thereof can be performed once, repeatedly, iteratively, periodically (e.g., with a specified update interval/frequency), aperiodically, continuously (e.g., over a discrete time interval, substantially continuously based on a data collection rate or frame rate, etc.), and/or with any other suitable timing. Sub-elements can occur sequentially/serially (e.g., for a single iteration of the method) and/or contemporaneously, simultaneously, and/or concurrently (e.g., across multiple iterations of the method and/or elements thereof), and/or with any other suitable timing or relationship.

Determining image data S110 functions to provide an input(s) to be used for object identification and/or classification. Image data is preferably generated and/or received periodically in accordance with a predetermined frame rate (e.g., less than 3 FPS, 3 FPS, 5 FPS, 10 FPS, 20 FPS, 30 FPS, greater than 30 FPS, any open or closed range bounded by the aforementioned values, etc.), and/or update frequency, but can alternatively be received with any other suitable timing/frequency. Image data is preferably sampled by and/or received from an imaging system, such as an imaging system mounted to a robotic assembly system, but can alternatively be received from a set of remote/external sensors and/or any suitable set of endpoint(s). For example, images can be received from a first set of cameras mounted above (and oriented towards) a conveyor workspace, and a second set of cameras mounted above (and oriented towards) a foodstuff bin(s). S110 can include: receiving bin images and receiving conveyor images. Bin images and conveyor images can be captured synchronously, asynchronously, contemporaneously (e.g., during robot operation on a particular set of foodstuff ingredients), and/or with any other suitable timing/relationship.

The image data preferably includes a first set of images of a conveyor transporting a set of bowls/containers (i.e., conveyor images) and a second set of images of a foodstuff bin (i.e., bin images) housing foodstuffs to be inserted into the containers. The conveyor images may segmented into individual container images (e.g., via Block S120) and compared against the bin images (e.g., via Block S130) to classify a container state (e.g., binary state; classified as 'complete' if the container has been served the target foodstuffs; 'incomplete' if the container has not been served the target foodstuffs).

Images are preferably captured by a plurality of cameras (e.g., 2, 4, etc.), but can alternatively be captured by a single camera (e.g., segmented regions within a single image), and/or can be otherwise captured. For example, the bin images can be segmented based on the pose/arrangement of the bin (e.g., predetermined, automatically detected/segmented, etc.; an example is shown in FIGURE). The image data can include: RGB images, depth images, 3D imaging data, point clouds, and/or any other suitable imaging data. Imaging data can optionally be pre-processed based on a sensor calibration (e.g., bundle adjusted based on sensor pose, cropped to remove image regions beyond conveyor workspace, etc.), converted into standardized coordinate frame (e.g., conveyor workspace of a robotic assembly module, etc.), transformed into a uniform pixel-to-distance image, and/or can be otherwise suitably pre-formatted or, alternatively, not be pre-formatted. In variants, S110 can be performed in-situ with a robotic foodstuff assembly module (e.g., registered pose/arrangement relative to a conveyor line and/or in a particular machine configuration). Additionally or alternatively, S110 can be performed by a separate/external system and/or using any other suitable imaging sensors/systems. However, imaging data can be otherwise suitably received and/or any other suitable sensor data can be used to facilitate other portions of the method.

For example, 2D, 2.5D, and/or 3D image data can be used for cross-coordination of modules and/or bowl tracking/classification.

However, images can be otherwise collected and/or can include or be associated with any other suitable data.

Identifying a container(s) using an object detector S120 functions to detect containers within the set of image data (e.g., from Block S110) to facilitate classification and/or ingredient insertion. Containers are preferably detected using a pretrained object detector, which detects unique object (container) instances from the imaging data, but can be otherwise suitably identified. Based on the identification(s), the conveyor imaging data can be segmented into an individual container image(s), for each container instance ID, to facilitate classification of the container state (e.g., via Block S130). As an example, a 3D object detector may output a pose estimate for each container, which can be used to segment a (separate) set of 2D image data. Alternatively, an object detector may receive 2D image data and output a bounding box and/or segmented image for each container instance. The object detector is preferably pretrained on a generalized set of training data (i.e., not specific to a single container geometry, ingredient type, conveyor line, etc.), but can alternatively be context-specific and/or can be otherwise implemented. As an example, the object detector can be one of the bowl detector(s) and/or object detectors as described in U.S. application Ser. No. 17/881,475, filed 4 Aug. 2022, U.S. application Ser. No. 18/075,961, filed 6 Dec. 2022, U.S. application Ser. No. 18/379,127, filed 11 Oct. 2023, and/or U.S. application Ser. No. 18/499,092, filed 31 Oct. 2023, each of which is incorporated herein in its entirety by this reference.

Bowls are preferably detected/identified from an individual image representation/frame of the imaging data received in S110, but can alternatively be generated with and/or tracked across multiple representations (e.g., a combination of point clouds and/or images captured within a single timestep, stereo-image, etc.), detected using point cloud data, and/or detected across multiple frames of imaging data (e.g., estimating object pose with an object tracker, where a portion of the frame may be occluded, etc.), and/or can be otherwise suitably detected. The bowls are preferably detected using the object detector (e.g., a generalized 3D object detector), but can be detected based on heuristic processes, depth image filtering, and/or any other suitable object detection techniques. In a specific example, bowls can be detected via one or more of the bowl detection processes as described in U.S. application Ser. No. 17/881,475, filed 4 Aug. 2022, which is incorporated herein in its entirety by this reference.

Bowl detection in S120 is preferably performed based on the image data sampled from S110 as an input, and can be performed synchronously, contemporaneously, and/or asynchronously (e.g., subsequently) with image data sampling. In variants, bowl detection may be performed based on a first subset of data (e.g., 3D point cloud) to facilitate classification using a second subset of data (e.g., segmented 2D RGB images).

The object detector can determine a container pose estimate in a sensor coordinate frame (and/or robot coordinate frame) based on the input images. The container pose estimate can be a 2D pose estimate, 2.5D pose estimate (e.g., under an assumption of planarity), 3D pose estimate, and/or any other suitable pose estimate. The pose estimate can include: a bounding box (e.g., defined from max/min positions for a set of orthogonal axes; axis aligned, not axis aligned, etc.), corner points, primary container axis, central point (e.g., center point of a circular bowl, centroid, etc.), a set of identified key points (e.g., corner point, center point of a circular bowl, centroid, etc.), and/or any other suitable pose estimate. The container pose estimate is preferably determined as an object pose estimate output of the object detector, but can be otherwise suitably determined (e.g., bounding box; image segment/region; etc.).

S120 preferably includes segmenting a container image(s) based on the pose estimate (and/or object detection/identification). For example, the conveyor image(s) can be segmented to separately identify each container for individual classification via S130. In variants, S120 can determine a single segmented container image based on the detected container pose and/or a plurality of segmented container images.

However, containers can be otherwise suitably detected/identified in Block S120.

Classifying a container state S130 functions to determine a (binary) state of the detected container(s). More preferably, S130 classifies each container state based on a comparison of the (segmented) container image with the bin image(s) using the similarity model (e.g., SNN comparison and/or cluster space comparison). The similarity model can compare the segmented container image to a single (e.g., current) bin image and/or a time history (e.g., rolling, short-term history; last 10 frames, last 15 seconds of consecutive frames, etc.). As an example, rolling comparison windows may be less sensitive to edge/corner cases (e.g., in the current frame, such as an occlusion caused by a robot arm; foodstuff refill event; larger data volume; etc.) and/or variations over longer time horizons (e.g., foodstuff ingredients regularly vary between batches, shifts, SKUs; substantially similar lighting conditions may exist for images within a short time window; etc.). Additionally or alternatively, container states can be classified by tracking coordination between modules (e.g., based on a priori object tracks), context-specific classification techniques (e.g., container position relative to the conveyor and/or features thereof;

lane-based container classification), pattern-based classification techniques (e.g., inferred context patterns based on historical data and/or derived features, etc.), and/or can be otherwise classified In variants, S130 can optionally classify the container state based on multiple models and/or classification approaches with a decision layer. A decision layer can determine the container classification using the outputs of the similarity model and/or classifications from one or more of: a context-specific classifier (e.g., facilitating classification based on context-specific factors such as conveyor appearance, bowl poses relative to the conveyor, etc.), a pattern-based classification model (e.g., current, historical, and/or external classifications can be used to infer assembly patterns, which can be used to classify individual containers), a coordinated tracking module (e.g., coordinating classification with a priori data and/or object tracks from an external object tracker, such as an upstream system), and/or any other suitable models/elements. For example, a pattern-based classification model may score detections based on historical patterns in tracked/labeled containers (e.g., where alternating containers have been completed upstream; based on container orientation; etc.). As a second example, a context-specific classifier can score detections based on a specific assembly context/configuration, such as based on a detected bowl orientation (e.g., where the robot can be configured to target all containers with a particular orientation), conveyor appearance (e.g., target containers within a stripe of a particular color; container texture), container geometry/shape, container arrangement relative to the belt (e.g., where containers spacing or relative arrangement about the belt axis may direct insertion).

However, container states can be otherwise suitably classified.

Optionally performing an action based on the container state classification S140 preferably functions to facilitate robot operation and/or foodstuff insertion based on the container state (i.e., targeting bowls of the 'incomplete' state). As an example, S140 can include controlling a robot to insert foodstuffs from the bin into a detected container classified with an 'incomplete' state. S140 can include: selecting one or more containers for ingredient insertion (e.g., based on the classified container state), controlling the robot based on the selected container(s), and/or any other suitable elements.

In variants, S140 can include: selecting a container, classified with an incomplete state, for ingredient insertion; automatically determining (e.g., at a controller) a set of control instructions for the foodstuff assembly robot based on the target; and executing the set of control instructions at the foodstuff assembly robot to insert the foodstuff ingredient. As an example, S140 can include controlling a foodstuff assembly robot as described in U.S. application Ser. No. 17/881,484, filed 4 Aug. 2022, which is incorporated herein in its entirety by this reference.

Additionally or alternatively, S140 can include dynamic insertion scheduling as described in Ser. No. 18/075,961, filed 6 Dec. 2022, which is incorporated herein in its entirety by this reference.

However, the method can include any other suitable elements.

8. Variants

In one set of variants, a method for multi-insertion control of aggregate foodstuffs with a robot arm along a conveyor line, the method comprising: picking aggregate foodstuffs from a foodstuff bin using a first and a second utensil, wherein both the first and second utensils are coupled to the robot arm; contemporaneously with picking aggregate foodstuffs, determining a set of images of a robot workspace; based on the set of images, determining a plurality of container tracks for a plurality of containers within the robot workspace; based on a first container track of the plurality of container tracks, controlling the robot arm to insert the aggregate foodstuff from the first utensil into a first container along the conveyor line; determining a robot arm trajectory based on a second container track of the plurality of container tracks; and based on the robot arm trajectory, controlling the robot arm to insert the aggregate foodstuff from the second utensil into a second container along the conveyor line.

In one variant, the first and second utensils each comprise: a set of scoops, each comprising a cavity and defining a set of apertures; a set of ingressive elements, each associated with a scoop of the set of scoops; and a set of mechanical linkages coupling the set of scoops to the respective actuator. As an example, the set of scoops comprises a first scoop integrated with a first set of ingressive elements as a first unitary body, and a second scoop integrated with a second set of ingressive elements as a second unitary body, wherein the first and second unitary bodies are substantially symmetric.

In one or more variants, picking aggregate foodstuffs from the foodstuff bin using the first and second foodstuff utensils comprises simultaneously actuating the first and second actuators.

In one or more variants, the robot arm trajectory is determined based on an offset between the first and second utensils. As an example, the method can further comprise selecting a pick target based on a model of the foodstuff bin, a target portion amount of the aggregate foodstuffs, and the offset between the first and second utensils. As a second example, the pick target is selected contemporaneously with controlling the robot arm to insert the aggregate foodstuff from the second utensil into a second container.

In one or more variants, the method can include estimating an amount of aggregate foodstuffs picked by the first utensil based on a change in weight of the foodstuff bin.

In one or more variants, the robot arm trajectory is determined concurrently with controlling the robot arm to insert the aggregate foodstuff from the first utensil into the first container.

In one or more variants, further comprising: capturing a second set of images contemporaneously with controlling the robot arm to insert the aggregate foodstuff from the first utensil into the first container, wherein the second container is at least partially occluded, by the robot arm, in each image of the second set of images.

In one or more variants, the first actuator and the second actuator comprise pneumatic actuators. In one example, the first actuator and the second actuator are single-stroke pneumatic actuators.

In one or more variants, the first container and the second container are arranged within the same lane of a multi-lane conveyor.

In one or more variants, the method comprises, prior to determining the robot arm trajectory based on a second container track: controlling the robot arm to maintain a grasp the aggregate foodstuffs with the second utensil above the foodstuff bin; and determining a second set of images of a robot workspace. In one example, the robot arm trajectory is determined based on a detection of the second container within second set of images.

In one set of variants, a multi-deposit system for aggregate manipulation of foodstuffs with a robot arm, the multi-deposit robot system comprising: a first and a second actuator, each mounted to a distal end of the robot arm; a first and a second utensil coupled to the first and second actuators, respectively, each of the first and second utensils comprising: a set of scoops, each comprising a grasp cavity and defining a set of apertures; a set of ingressive elements, each associated with a scoop from the set of scoops; and a set of mechanical linkages coupling the set of scoops to the respective actuator, wherein the set of mechanical linkages is configured to transform the set of scoops between a first and a second configuration based on an actuation of the respective actuator.

In one or more variants, in the first configuration, each ingressive element is outside of an interior grasp volume of each grasp cavity, wherein, in the second configuration, each of the ingressive elements ingress the respective scoop of the set of scoops through a respective aperture of the respective scoop, wherein each ingressive element is aligned with the respective aperture.

In one or more variants, the first and the second actuator are configured to synchronously articulate the utensils from the second configuration to the first configuration, wherein the first and the second actuator are configured to asynchronously articulate the utensils from the first configuration to the second configuration.

In one or more variants, a linear offset between the first and second utensils is set based on a predefined container offset along a conveyor line.

In one or more variants, the set of scoops comprises a first scoop integrated with a first set of ingressive elements as a first unitary body, and a second scoop integrated with a second set of ingressive elements as a second unitary body, wherein the first and second unitary bodies are substantially symmetric.

In variants, the first and second utensils can be the same or different. For example, the first and second utensils can any of the utensils as described in: U.S. application Ser. No. 17/965,202, filed 13 Oct. 2022, and/or U.S. application Ser. No. 17/881,475, filed 4 Aug. 2022, each of which is incorporated herein in its entirety by this reference; and/or any other suitable utensil(s).

However, the system and/or method can be otherwise configured.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for multi-insertion control of aggregate foodstuffs with a robot arm along a conveyor line, the method comprising:
   picking aggregate foodstuffs from a foodstuff bin using a first and a second utensil, wherein both the first and second utensils are coupled to the robot arm;
   contemporaneously with picking aggregate foodstuffs, determining a set of images of a robot workspace;
   based on the set of images, determining a plurality of container tracks for a plurality of containers within the robot workspace;
   based on a first container track of the plurality of container tracks, controlling the robot arm to insert the aggregate foodstuff from the first utensil into a first container along the conveyor line;
   concurrently with controlling the robot arm to insert the aggregate foodstuff from the first utensil into the first container, determining a robot arm trajectory based on a second container track of the plurality of container tracks; and
   based on the robot arm trajectory, controlling the robot arm to insert the aggregate foodstuff from the second utensil into a second container along the conveyor line.

2. The method of claim 1, wherein the first and second utensils each comprise:
   a set of scoops, each comprising a cavity and defining a set of apertures;
   a set of ingressive elements, each associated with a scoop of the set of scoops; and
   a set of mechanical linkages coupling the set of scoops to a respective actuator.

3. The method of claim 2, wherein the set of scoops comprises a first scoop integrated with a first set of ingressive elements as a first unitary body, and a second scoop integrated with a second set of ingressive elements as a second unitary body, wherein the first and second unitary bodies are substantially symmetric.

4. The method of claim 1, wherein picking aggregate foodstuffs from the foodstuff bin using the first and second foodstuff utensils comprises simultaneously actuating a first actuator of the first foodstuff utensil and a second actuator of the second foodstuff utensil.

5. The method of claim 1, wherein the robot arm trajectory is determined based on an offset between the first and second utensils.

6. The method of claim 5, further comprising: selecting a pick target based on a model of the foodstuff bin, a target portion amount of the aggregate foodstuffs, and the offset between the first and second utensils.

7. The method of claim 6, wherein the pick target is selected contemporaneously with controlling the robot arm to insert the aggregate foodstuff from the second utensil into a second container.

8. The method of claim 6, further comprising: estimating an amount of aggregate foodstuffs picked by the first utensil based on a change in weight of the foodstuff bin.

9. The method of claim 1, further comprising: capturing a second set of images contemporaneously with controlling the robot arm to insert the aggregate foodstuff from the first utensil into the first container, wherein the second container is at least partially occluded, by the robot arm, in each image of the second set of images.

10. The method of claim 1, wherein the first and second foodstuff utensils each comprise a pneumatic actuator.

11. The method of claim 10, wherein the pneumatic actuators are single-stroke pneumatic actuators.

12. The method of claim 1, wherein the first container and the second container are arranged within the same lane of a multi-lane conveyor.

13. The method of claim 1, further comprising, prior to determining the robot arm trajectory based on a second container track:

controlling the robot arm to maintain a grasp of the aggregate foodstuffs with the second utensil above the foodstuff bin; and determining a second set of images of a robot workspace.

14. The method of claim 13, wherein the robot arm trajectory is determined based on a detection of the second container within the second set of images.

15. A method for multi-insertion control of aggregate foodstuffs with a robot arm along a conveyor line, the method comprising:

picking aggregate foodstuffs from a foodstuff bin using a first and a second utensil, wherein both the first and second utensils are coupled to the robot arm;

contemporaneously with picking aggregate foodstuffs, determining a set of images of a robot workspace;

based on the set of images, determining a plurality of container tracks for a plurality of containers within the robot workspace;

based on a first container track of the plurality of container tracks, controlling the robot arm to insert the aggregate foodstuff from the first utensil into a first container along the conveyor line;

determining a robot arm trajectory based on a second container track of the plurality of container tracks, wherein the robot arm trajectory is determined based on an offset between the first and second utensils; and based on the robot arm trajectory, controlling the robot arm to insert the aggregate foodstuff from the second utensil into a second container along the conveyor line, wherein the method further comprises: selecting a pick target based on a model of the foodstuff bin, a target portion amount of the aggregate foodstuffs, and the offset between the first and second utensils.

16. The method of claim 15, wherein the pick target is selected contemporaneously with controlling the robot arm to insert the aggregate foodstuff from the second utensil into a second container.

17. The method of claim 15, further comprising: estimating an amount of aggregate foodstuffs picked by the first utensil based on a change in weight of the foodstuff bin.

* * * * *